US011925921B2

(12) United States Patent
Way et al.

(10) Patent No.: US 11,925,921 B2
(45) Date of Patent: Mar. 12, 2024

(54) METHODS OF MAKING YSZ SUPPORTED CATALYST, AND METHODS OF USING THE SAME

(71) Applicant: Colorado School of Mines, Golden, CO (US)

(72) Inventors: James Douglas Way, Boulder, CO (US); Colin A. Wolden, Denver, CO (US); Zhenyu Zhang, Arvada, CO (US)

(73) Assignee: COLORADO SCHOOL OF MINES, Golden, CO (US)

( * ) Notice: Subject to any disclaimer, the term of this patent is extended or adjusted under 35 U.S.C. 154(b) by 228 days.

(21) Appl. No.: 16/994,296

(22) Filed: Aug. 14, 2020

(65) Prior Publication Data

US 2021/0046456 A1 Feb. 18, 2021

Related U.S. Application Data

(60) Provisional application No. 62/886,770, filed on Aug. 14, 2019.

(51) Int. Cl.
| | |
|---|---|
| *B01J 23/46* | (2006.01) |
| *B01J 21/06* | (2006.01) |
| *B01J 23/02* | (2006.01) |
| *B01J 23/10* | (2006.01) |
| *B01J 35/10* | (2006.01) |
| *B01J 37/02* | (2006.01) |
| *C01C 1/04* | (2006.01) |

(52) U.S. Cl.
CPC ............. *B01J 23/462* (2013.01); *B01J 23/02* (2013.01); *B01J 23/10* (2013.01); *B01J 35/1009* (2013.01); *B01J 37/0201* (2013.01); *C01C 1/0411* (2013.01); *B01J 21/066* (2013.01)

(58) Field of Classification Search
CPC ....... B01J 23/02; B01J 37/0201; B01J 21/066
See application file for complete search history.

(56) References Cited

U.S. PATENT DOCUMENTS 5,134,109 A * 7/1992 Uchiyama ................. C01B 3/40
423/652
2021/0114005 A1 * 4/2021 Tao ........................... B01J 23/10

FOREIGN PATENT DOCUMENTS

JP 2013039520 A * 2/2013

OTHER PUBLICATIONS

Skodra et al.(Electrocatalytic synthesis of ammonia from steam and nitrogen at atmospheric pressure, Elsevier, 2009). (Year: 2009).*

(Continued)

*Primary Examiner* — Colin W. Slifka
*Assistant Examiner* — Logan Edward Laclair
(74) *Attorney, Agent, or Firm* — Sheridan Ross P.C.

(57) ABSTRACT

The present invention relates to catalysts, methods of making catalysts, and methods of using catalysts, where the catalysts include: at least one of a transition metal and a transition metal oxide supported by yttria-stabilized zirconia (YSZ), where the transition metal is promoted by at least one of an alkali metal and an alkaline-earth metal.

19 Claims, 23 Drawing Sheets
(9 of 23 Drawing Sheet(s) Filed in Color)

(56) References Cited

OTHER PUBLICATIONS

Aika et al., "Preparation and characterization of chlorine-free ruthenium catalysts and the promoter effect in ammonia synthesis: 3. A magnesia-supported ruthenium catalyst," Journal of Catalysis, vol. 136, No. 1, Jul. 1992, pp. 126-140. Abstract Only.
Aika, "Role of alkali promoter in ammonia synthesis over ruthenium catalysts—Effect on reaction mechanism," Catalysis Today, vol. 286, May 15, 2017, pp. 14-20. Abstract Only.
Becue et al., "Effect of Cationic Promoters on the Kinetics of Ammonia Synthesis Catalyzed by Ruthenium Supported on Zeolite X," Journal of Catalysis, vol. 179, No. 1, Oct. 1, 1998, pp. 129-137. Abstract Only.
Collins et al., "Preparation and characterization of a composite palladium-ceramic membrane," Industrial & Engineering Chemistry Research, vol. 32, No. 12, Dec. 1, 1993, pp. 3006-3013.
Coltrin et al., "Surface chemkin: A general formalism and software for analyzing heterogeneous chemical kinetics at a gas-surface interface," International Journal of Chemical Kinetics, vol. 23, No. 12, Dec. 1991, pp. 1111-1128. Abstract Only.
Dahl et al., "Surface science based microkinetic analysis of ammonia synthesis over ruthenium catalysts," Journal of Catalysis, vol. 192, No. 2, Jun. 10, 2000, pp. 391-399. Abstract Only.
Deuflhard et al., "One-step and extrapolation methods for differential-algebraic systems," Numerische Mathematik, vol. 51, Sep. 1987, pp. 501-516. Abstract Only.
García-García et al., "Role of B5-Type Sites in Ru Catalysts used for the NH3 Decomposition Reaction," Topics in Catalysis, vol. 52, Apr. 9, 2009, pp. 758-764.
Gossler et al., "CaRMeN: An Improved Computer-Aided Method for Developing Catalytic Reaction Mechanisms," Catalysts, vol. 9, No. 3, Mar. 1, 2019, 11 pages.
Hinrichsen et al., "The Kinetics of Ammonia Synthesis over Ru-Based Catalysts: 1. The Dissociative Chemisorption and Associative Desorption of N2," Journal of Catalysis, vol. 165, 1997, pp. 33-44.
Hinrichsen et al., "The microkinetics of ammonia synthesis catalyzed by cesium-promoted supported ruthenium," Chemical Engineering Science, vol. 51, No. 10, May 1996, pp. 1683-1690. Abstract Only.
Jacobi et al., "Nitrogen chemistry on ruthenium single-crystal surfaces," Applied Surface Science, vol. 121-122, Nov. 2, 1997, pp. 558-561. Abstrac Only.
Jacobsen et al., "Structure sensitivity of supported ruthenium catalysts for ammonia synthesis," Journal of Molecular Catalysis A: Chemical, vol. 163, May 15, 2000, pp. 19-26.
Karakaya et al., "Catalytic Chemistry for Methane Dehydroaromatization (MDA) on a Bifunctional Mo/HZSM-5 Catalyst in a Packed Bed," Industrial & Engineering Chemistry Research, vol. 55, No. 37, Aug. 31, 2016, pp. 9895-9906. Abstract Only.
Kitano et al., "Ammonia synthesis using a stable electride as an electron donor and reversible hydrogen store," Nature Chemistry, vol. 4, Oct. 21, 2012, pp. 934-940. Abstract Only.
Klerke et al., "Ammonia for hydrogen storage: challenges and opportunities," Journal of Materials Chemistry, vol. 18, No. 20, May 28, 2008, pp. 2285-2392.
Larichev et al., "Effect of the Support on the Nature of Metal-Promoter Interactions in Ru—Cs+/MgO and Ru—Cs+-Al2O3 Catalysts for Ammonia Synthesis," Kinetics and Catalysis, vol. 46, No. 6, 2005, pp. 891-899.
Li et al., "An efficient route for the preparation of activated carbon supported ruthenium catalysts with high performance for ammonia synthesis," Catalysis Today, vol. 174, No. 1, Oct. 2, 2011, pp. 97-105. Abstract Only.
Maier et al., "Steam Reforming of Methane Over Nickel: Development of a Multi-Step Surface Reaction Mechanism," Topics in Catalysis, vol. 54, Aug. 2, 2011, pp. 845-858.
Malmali et al., "Ammonia Synthesis at Reduced Pressure via Reactive Separation," Industrial & Engineering Chemistry Research, vol. 55, Jul. 25, 2016, pp. 8922-8932.
Mhadeshwar et al., "Thermodynamic Consistency in Microkinetic Development of Surface Reaction Mechanisms," Journal of Physical Chemistry B, vol. 107, No. 46, Oct. 16, 2003, p. 12721-12733. Abstract Only.
Morgan, "Techno-Economic Feasibility Study of Ammonia Plants Powered by Offshore Wind," Dissertation Submitted to the Graduate School of the University of Massachusetts Amherst, Feb. 2013. 432 pages.
Nørskov et al., "Priority Communication: Universality in Heterogeneous Catalysis," Journal of Catalysis, vol. 209, 2002, pp. 275-278.
Ogawa et al., "High Electron Density on Ru in Intermetallic YRu2: The Application to Catalyst for Ammonia Synthesis," Journal of Physical Chemistry C, vol. 122, No. 19, Apr. 23, 2018, pp. 120468-10475. Abstract Only.
Ogura et al., "Ru/La0.5Pr0.5O1.75 Catalyst for Low-Temperature Ammonia Synthesis," ACS Sustainable Chemistry & Engineering, vol. 8, No. 12, Oct. 31, 2018, pp. 17258-17266. Abstract Only.
Pan et al., "Tuning/exploiting Strong Metal-Support Interaction (SMSI) in Heterogeneous Catalysis," Journal of the Taiwan Institute of Chemical Engineers, vol. 73, Mar. 9, 2017, pp. 154-186.
Rosowski et al., "Ruthenium catalysts for ammonia synthesis at high pressures: Preparation, characterization, and power-law kinetics," Applied Catalysis A: General, vol. 151, No. 2, Apr. 10, 1997, pp. 443-460. Abstract Only.
Sato et al., "A low-crystalline ruthenium nano-layer supported on praseodymium oxide as an active catalyst for ammonia synthesis," Chemical Science, vol. 8, 2017, pp. 674-679.
Schneider et al., "NIH Image to ImageJ: 25 years of Image Analysis," Nature Methods, vol. 9, No. 7, Jul. 2012, pp. 671-675.
Shimoda et al., "Ammonia synthesis over yttrium-doped barium zirconate and cerate-based perovskite-type oxide supported ruthenium catalysts," International Journal of Hydrogen Energy, vol. 42, No. 50, Dec. 14, 2017, p. 29745-29755. Abstract Only.
Siporin et al., "Isotopic transient analysis of ammonia synthesis over Ru/MgO catalysts promoted by cesium, barium, or lanthanum," Journal of Catalysis, vol. 222, No. 2, Mar. 10, 2004, pp. 315-322. Abstract Only.
Siporin et al., "Use of kinetic models to explore the role of base promoters on Ru/MgO ammonia synthesis catalysts," Journal of Catalysis, vol. 225, No. 2, Jul. 25, 2004, pp. 248-368. Abstract Only.
Tauster, "Strong Metal-Support Interactions," Accounts of Chemical Research, vol. 20, No. 11, Nov. 1987, pp. 389-394.
Tsai et al., "Steady-state decomposition of ammonia on the ruthenium(001) surface," Journal of Physical Chemistry, vol. 91, No. 20, Sep. 1, 1987, pp. 5302-5307. Abstract Only.
Wang et al., "Highly effective perovskite-type BaZrO3 supported Ru catalyst for ammonia synthesis," Applied Catalysis A: General, vol. 458, May 10, 2013, pp. 130-136. Abstract Only.
Wang et al., "Ruthenium catalyst supported on high-surface-area basic ZrO2 for ammonia synthesis," Journal of Molecular Catalysis A: Chemical, vol. 378, Nov. 1, 2013, pp. 307-313. Abstract Only.
Zhang et al., "Barium-Promoted Ruthenium Catalysts on Yittria-Stabilized Zirconia Supports for Ammonia Synthesis," ACS Sustainable Chemistry and Engineering, vol. 7, Oct. 7, 2019, pp. 18038-18047.
Zhang et al., "Efficient Ammonia Decomposition in a Catalytic Membrane Reactor to Enable Hydrogen Storage and Utilization," ACS Sustainable Chemistry & Engineering, vol. 7, No. 6, Feb. 27, 2019, 29 pages.
Zhu et al., "Catalytic partial oxidation of methane using RhSr- and Ni-substituted hexaaluminates," Proceedings of the Combustion Institute, vol. 31, No. 2, Jan. 2007, pp. 1965-1972. Abstract Only.
Aika et al., "Preparation and characterization of chlorine-free ruthenium catalysts and the promoter effect in ammonia synthesis: 3. A magnesia-supported ruthenium catalyst," Journal of Catalysis, vol. 136, No. 1, Jul. 1992, pp. 126-140.
Aika, "Role of alkali promoter in ammonia synthesis over ruthenium catalysts—Effect on reaction mechanism," Catalysis Today, vol. 286, May 15, 2017, pp. 14-20.

(56) References Cited

OTHER PUBLICATIONS

Appl et al., "Ammonia: Principles and Industrial Practice," Vch Verlagsgesellschaft Mbh, 1999, Preface Only.
Bécue et al., "Effect of Cationic Promoters on the Kinetics of Ammonia Synthesis Catalyzed by Ruthenium Supported on Zeolite X," Journal of Catalysis, vol. 179, No. 1, Oct. 1, 1998, pp. 129-137.
Brenan et al., "Numerical Solution of Initial-Value Problems in Differential-Algebraic Equations," Society for Industrial and Applied Mathematics, Philadelphia, PA, 1996. Preface Only.
Coltrin et al., "Surface chemkin: A general formalism and software for analyzing heterogeneous chemical kinetics at a gas-surface interface," International Journal of Chemical Kinetics, vol. 23, No. 12, Dec. 1991, pp. 1111-1128.
Dahl et al., "Surface science based microkinetic analysis of ammonia synthesis over ruthenium catalysts," Journal of Catalysis, vol. 192, No. 2, Jun. 10, 2000, pp. 391-399.
Deuflhard et al., "One-step and extrapolation methods for differential-algebraic systems," Numerische Mathematik, vol. 51, Sep. 1987, pp. 501-516.
Deutschmann et al., "Modeling and Simulation of Heterogeneous Catalytic Reactions: From the Molecular Process to the Technical System," John Wiley & Sons, Weinheim, Germany, 2012. Preface only.
Hinrichsen et al., "The microkinetics of ammonia synthesis catalyzed by cesium-promoted supported ruthenium," Chemical Engineering Science, vol. 51, No. 10, May 1996, pp. 1683-1690.
Jacobi et al., "Nitrogen chemistry on ruthenium single-crystal surfaces," Applied Surface Science, vol. 121-122, Nov. 2, 1997, pp. 558-561.
Karakaya et al., "Catalytic Chemistry for Methane Dehydroaromatization (MDA) on a Bifunctional Mo/HZSM-5 Catalyst in a Packed Bed," Industrial & Engineering Chemistry Research, vol. 55, No. 37, Aug. 31, 2016, pp. 9895-9906.
Kitano et al., "Ammonia synthesis using a stable electride as an electron donor and reversible hydrogen store," Nature Chemistry, vol. 4, Oct. 21, 2012, pp. 934-940.
Li et al., "An efficient route for the preparation of activated carbon supported ruthenium catalysts with high performance for ammonia synthesis," Catalysis Today, vol. 174, No. 1, Oct. 2, 2011, pp. 97-105.
Mhadeshwar et al., "Thermodynamic Consistency in Microkinetic Development of Surface Reaction Mechanisms," Journal of Physical Chemistry B, vol. 107, No. 46, Oct. 16, 2003, pp. 12721-12733.
Ogawa et al., "High Electron Density on Ru in Intermetallic YRu2: The Application to Catalyst for Ammonia Synthesis," Journal of Physical Chemistry C, vol. 122, No. 19, Apr. 23, 2018, pp. 120468-10475.
Ogura et al., "Ru/La0.5Pr0.5O1.75 Catalyst for Low-Temperature Ammonia Synthesis," ACS Sustainable Chemistry & Engineering, vol. 8, No. 12, Oct. 31, 2018, pp. 17258-17266.
Rosowski et al., "Ruthenium catalysts for ammonia synthesis at high pressures: Preparation, characterization, and power-law kinetics," Applied Catalysis A: General, vol. 151, No. 2, Apr. 10, 1997, pp. 443-460.
Shimoda et al., "Ammonia synthesis over yttrium-doped barium zirconate and cerate-based perovskite-type oxide supported ruthenium catalysts," International Journal of Hydrogen Energy, vol. 42, No. 50, Dec. 14, 2017, pp. 29745-29755.
Siporin et al., "Isotopic transient analysis of ammonia synthesis over Ru/MgO catalysts promoted by cesium, barium, or lanthanum," Journal of Catalysis, vol. 222, No. 2, Mar. 10, 2004, pp. 315-322.
Siporin et al., "Use of kinetic models to explore the role of base promoters on Ru/MgO ammonia synthesis catalysts," Journal of Catalysis, vol. 225, No. 2, Jul. 25, 2004, pp. 359-368.
Tsai et al., "Steady-state decomposition of ammonia on the ruthenium(001) surface," Journal of Physical Chemistry, vol. 91, No. 20, Sep. 1, 1987, pp. 5302-5307.
Wang et al., "Highly effective perovskite-type BaZrO3 supported Ru catalyst for ammonia synthesis," Applied Catalysis A: General, vol. 458, May 10, 2013, pp. 130-136.
Wang et al., "Ruthenium catalyst supported on high-surface-area basic ZrO2 for ammonia synthesis," Journal of Molecular Catalysis A: Chemical, vol. 378, Nov. 1, 2013, pp. 307-313.
Zhu et al., "Catalytic partial oxidation of methane using RhSr- and Ni-substituted hexaaluminates," Proceedings of the Combustion Institute, vol. 31, No. 2, Jan. 2007, pp. 1965-1972.
Apodaca, "2016 Minerals Yearbook: Nitrogen," U.S. Department of the Interior - U.S. Geological Survey, Feb. 2019, 15 pages.
Kee et al., "Chemically Reacting Flow: Theory, Modeling, and Simulation, 2nd Edition," John Wiley & Sons, Hoboken, NJ, 2018, Preface only.

\* cited by examiner

METHODS OF MAKING YSZ SUPPORTED CATALYST, AND METHODS OF USING THE SAME

CROSS REFERENCE TO RELATED APPLICATIONS

This application claims the benefit of U.S. Provisional Patent Application No. 62/886,770 entitled "Methods of Making YSZ Supported Catalyst, and Methods of Using the Same" filed on Aug. 14, 2019, the entire disclosure of which is incorporated by reference herein.

GOVERNMENT LICENSE RIGHTS

This invention was made with government support under grant DE-AR0001004 awarded by Advanced Research Projects Agency-Energy (ARPA-E) and grant NSF 1512172 awarded by the National Science Foundation. The government has certain rights in the invention.

FIELD OF THE INVENTION

The present invention relates to yttria-stabilized zirconia (YSZ) supported catalysts, methods of making YSZ supported catalysts, and methods of using YSZ supported catalysts.

BACKGROUND OF THE INVENTION

Catalysis is the process of increasing the rate of a chemical reaction by adding a substance known as a catalyst. The catalyst is not consumed in the reaction and chemical reactions occur faster in the presence of a catalyst because the catalyst provides an alternative reaction pathway with a lower activation energy than the non-catalyzed mechanism.

Some catalysts are "supported," which means that the catalyst is dispersed on a second material. The reasons for using a support can vary, and include reducing agglomeration and/or sintering of catalyst particles, increasing an amount of surface area to expose additional catalyst to reactants, and providing a material with which the catalyst can interact to affect the catalytic reaction.

Ammonia ($NH_3$) is a highly produced inorganic chemical. Most ammonia is produced by the Haber process where atmospheric nitrogen ($N_2$) and hydrogen ($H_2$) gases react using a metal catalyst at high temperatures and high pressures.

SUMMARY OF THE INVENTION

The production of ammonia ($NH_3$) is essential to sustain an ever growing human population by providing the raw material for fertilizer. Conventionally, $NH_3$ is synthesized using the well-known Haber-Bosch process at a temperature of about 400 degrees Celcius (T≈400° C.) and a pressure of about 150 bar (p≈150 bar). The endothermic nature of $H_2$ generation and massive production scales (for example, 145 metric tons (MT) $NH_3$ in 2014 globally) make ammonia production one of the most energy intensive chemical processes, consuming as much as 2% of the world's total energy. Currently-used ammonia synthesis processes consume about a half of global $H_2$ production, require more energy, and emit more carbon dioxide ($CO_2$) than any other commodity chemical. The Department of Energy has estimated that about 100 trillion British Thermal Units (BTUs) of recoverable energy, valued at approximately $1 billion, is lost each year during ammonia production.

Recently, $NH_3$ has also attracted attention as a promising carrier for the transportation and storage of $H_2$ from renewable sources such as solar, wind, and biosources. Attributes as a storage material include its high H2 gravimetric (17.7 weight percent (wt %)) and volumetric (108 g $L^{-1}$) densities, its existence as a liquid at room temperature under 8 bar, and an existing infrastructure for distribution. These properties also make $NH_3$ attractive for the peak energy storage of renewable electricity. The cost-effective, small-scale, distributed synthesis of ammonia depends on effective catalysts and processes that operate under modest elevated pressure conditions, for example, p<20 bar. Various embodiments of the present disclosure are directed towards the context of low temperature synthesis of ammonia, using the reaction: $N_2+3H_2 \leftrightarrow 2NH_3$. Embodiments relate to YSZ supported catalysts, methods of making YSZ supported catalysts, and methods of using YSZ supported catalysts, including for the synthesis of ammonia. For the synthesis of ammonia using YSZ supported catalysts, nitrogen may be introduced through the porous layer, and hydrogen may be selectively introduced through a dense metal membrane such as palladium (Pd) or its alloys. The porous ceramic (YSZ) may be impregnated with a ruthenium (Ru) catalyst and then promoted to facilitate the production of ammonia. In embodiments, YSZ supported catalysts may be used to continuously synthesize ammonia using a gas containing hydrogen and nitrogen as a raw material, where a transition metal such as ruthenium promoted by alkali metals such as cesium (Cs), potassium (K), or barium (Ba) exhibits catalytic activity is supported by a support, and the support is YSZ.

Embodiments of the present disclosure consider Ru as the active catalyst supported on YSZ. The addition of alkali and alkaline-earth metal promoters is found to increase synthesis rates by an order of magnitude. The rate enhancement is largely insensitive to the promoter concentration, with Cs outperforming Ba and K by a factor of about 2. The Cs promoted catalyst may exhibit a higher initial activity, but may not be stable at elevated temperatures. In contrast, the Ba-supported catalyst may deliver improved stability and can achieve specific rates greater than currently used catalysts.

Ba is found to have greater stability whereas Cs degrades more rapidly, which is attributed to the low melting point of its oxide. At 400° C. and 1.0 megapascal (MPa), the specific synthesis rate over Ba—Ru is measured to be approximately 1410 mmol $g_{Ru}^{-1}h^{-1}$, higher than the most active oxide-supported Ru catalysts reported in the literature. The rate becomes inhibited by $H_2$ absorption at low temperature (below 350° C.), but lower $H_2/N_2$ ratios enable the rate to remain comparable to what is observed in stoichiometric mixtures at temperatures below 400° C.

The YSZ catalysts may be used for continuously reacting nitrogen with hydrogen, which are raw materials, on the catalyst, where the reaction is performed in an ammonia synthesis reaction system under conditions that promote the reaction. The YSZ supported catalyst may also have a high activity for the reverse reaction, e.g., ammonia decomposition to hydrogen and nitrogen.

In embodiments, the reaction conditions may be a reaction temperature that is equal to or higher than about 200 degrees Celsius (° C.) and equal to or lower than about 450° C., and a reaction pressure that is equal to or higher than about 10 kPa and lower than about 20 MPa. The reaction temperature may be typically from about 175° C. to about 475° C., typically from about 200° C. to about 450° C., typically from about 225° C. to about 425° C., typically from about 250° C. to about 375° C., typically from about 275° C. to about 350° C., and typically from about 300° C. to about 325° C. In embodiments, the reaction pressure may be typically from about 5 kilopascal (kPa) to about 25 MPa, typically from about 10 kPa to about 20 MPa, typically from about 15 kPa to about 15 MPa, typically from about 25 kPa to about 15 MPa, typically from about 50 kPa to about 10 MPa, typically from about 100 kPa to about 5 MPa, and typically from about 250 kPa to about 1000 kPa.

The present disclosure describes a new detailed microkinetic model that accurately captures the observed behavior, revealing that adsorption is coverage dependent. These results provide insight and direction into developing alternatives to Haber-Bosch for distributed synthesis of green ammonia.

Accordingly, the present disclosure has been described with some degree of particularity directed to the exemplary embodiments of the present invention. It should be appreciated though that modifications or changes may be made to the exemplary embodiments of the present invention without departing from the inventive concepts contained herein.

This Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention, and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description of the Invention, the drawing figures, and the exemplary claim set forth herein, taken in conjunction with this Summary of the Invention, define the invention.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

Figure 1A:
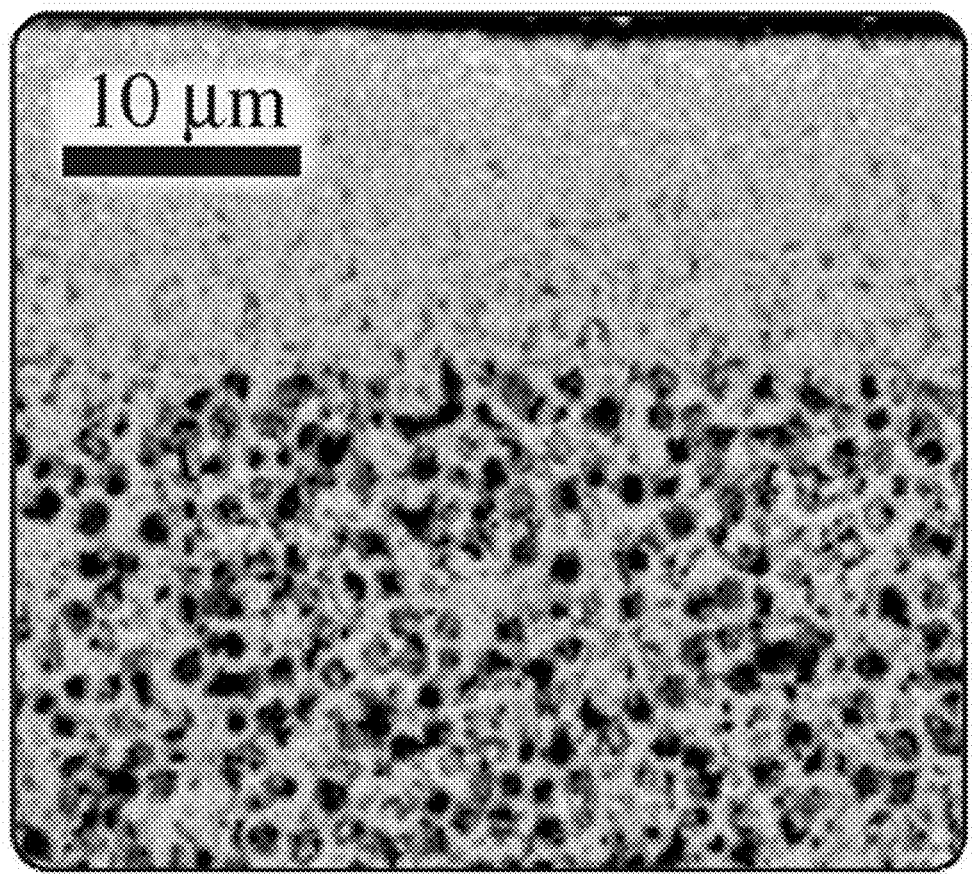
FIG. 1A shows an illustrative scanning electron microscope (SEM) cross section of an asymmetric YSZ support in accordance with various embodiments of the present disclosure.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures depict a catalytic membrane reactor, regions of a support, etc., the present disclosure is not limited to these embodiments.

Ammonia is produced conventionally in large centralized facilities in which the hydrogen is produced through steam methane reforming and subsequent purification. Hydrogen generation is responsible for the vast majority of energy consumption and $CO_2$ emissions associated with ammonia synthesis. Alternatively "green" ammonia could be derived from $H_2$ produced by electrolysis using renewable electrical energy. However, due to the distributed nature of renewable energy sources (e.g., solar and wind), small-scale $NH_3$ production is needed. Unfortunately, downscaling the capital intensive conventional Haber-Bosch process is thought to be uneconomical. Thus, alternatives to Haber-Bosch that are more amenable to small-scale, distributed production are desired.

The high pressure requirements of the Haber-Bosch process derive from severe equilibrium limitations at the elevated temperatures required for catalysts to achieve significant kinetic activity. However, significant synthesis rates may be maintained at modest pressure when ammonia is continuously removed through reactive separation processes such as absorption. Catalytic membrane reactors (CMR) are an alternative approach that have the potential to combine reactive separation as well as process intensification. CMR technology may be applied to the reverse process, delivery of high purity $H_2$ generated by ammonia decomposition. Efficient product removal via a hydrogen-selective membrane enabled significant reductions in operating temperature, and equilibrium constraints were exceeded without the use of a sweep gas.

Extending the CMR concept to the more-challenging problem of ammonia synthesis requires the development of highly permeable membranes that are selective to ammonia over $H_2/N_2$, and catalysts with improved activity at mild conditions. Embodiments of the present disclosure focus on catalysts with improved activity at mild conditions. Ruthenium (Ru) is an active metal catalyst for $NH_3$ synthesis. In addition, catalytic chemistry can be surface-structure sensitive, with significant variations among oxide supports. Comparisons of $NH_3$ synthesis rates using Ru catalysts on various metal-oxide supports have found that MgO>CaO>γ-$Al_2O_3$>$TiO_2$ and $Nb_2O_5$. The trend between activity and support basicity suggests an electronic modification of the Ru.

In addition to alkaline-earth metal oxides, transition-metal oxides can be partially reduced to create an enriched electron environment and accelerate the dissociative adsorption of $N_2$. The use of Ru supported on Ba— and K modified $ZrO_2$ can result in a higher $NH_3$ synthesis rate than unpromoted MgO or $ZrO_2$. Use of a yttrium doped barium zirconate ($BaZr_{0.9}Y_{0.1}O_{3-\delta}$) support obtained a synthesis rate of 4.63 mmol $g_{cat}^{-1}h^{-1}$ at 400° C. and 1 bar. $Pr_2O_3$ and $La_{0.5}Pr_{0.5}O_{1.75}$ have been used as the Ru catalyst support with the latter having a $NH_3$ synthesis rate of 60.2 mmol $g_{cat}^{-1}h^{-1}$ at 400° C. and 10 bar. Also, Ru alloyed directly with yttrium can tune electron density for ammonia synthesis.

The present disclosure focuses on ammonia synthesis, using yttria-stabilized zirconia (YSZ) as an active support for Ru based catalysts. The inventors of the present disclosure were motivated by the improved ammonia decomposition performance using porous YSZ tubes impregnated with Ru in catalytic membrane reactors. The present disclosure first evaluates the activity of YSZ as compared to the more commonly used $\alpha$-$Al_2O_3$ support. The present disclosure also describes the effects and stability of alkali and alkaline-earth metal promoters, the effects of space velocity, and the dependence of temperature, pressure, and $H_2/N_2$ feed ratio on $NH_3$ synthesis rates. A detailed microkinetic model is described to assist in explaining the rate-limiting processes and provide improved predictive capabilities.

EXPERIMENTAL PROCEDURES

Catalyst Preparation

The YSZ and $\alpha$-$Al_2O_3$ supports were supplied as porous tubes with an approximately 1 cm outside diameter and approximately 0.134 cm wall thickness. FIG. 1A shows an illustrative SEM cross section of an asymmetric YSZ support in accordance with embodiments of the present disclosure. In FIG. 1A, the YSZ support tube (e.g., 4% $Y_2O_3$, 96% $ZrO_2$) has an asymmetric structure. The exterior of the support is an about 20 micrometer (m) thick mesoporous region with pore diameters of approximately 0.2 μm, whereas the bulk is characterized with larger pores, e.g., $8 \leq d_p \leq 10$ μm. The $\alpha$-$Al_2O_3$ support is symmetric with uniform pore diameters of about 0.2 μm. The (Brunauer, Emmett and Teller) BET surface area of $\alpha$-$Al_2O_3$ is 4.42 $m^2g^{-1}$, whereas the surface area of YSZ is 2.24 $m^2g^{-1}$ due to its asymmetric structure and large pore size. The support tubes were cut and cleaned with deionized (DI) water and acetone to remove contaminants, followed by drying in air at 130° C.

Figure 12:
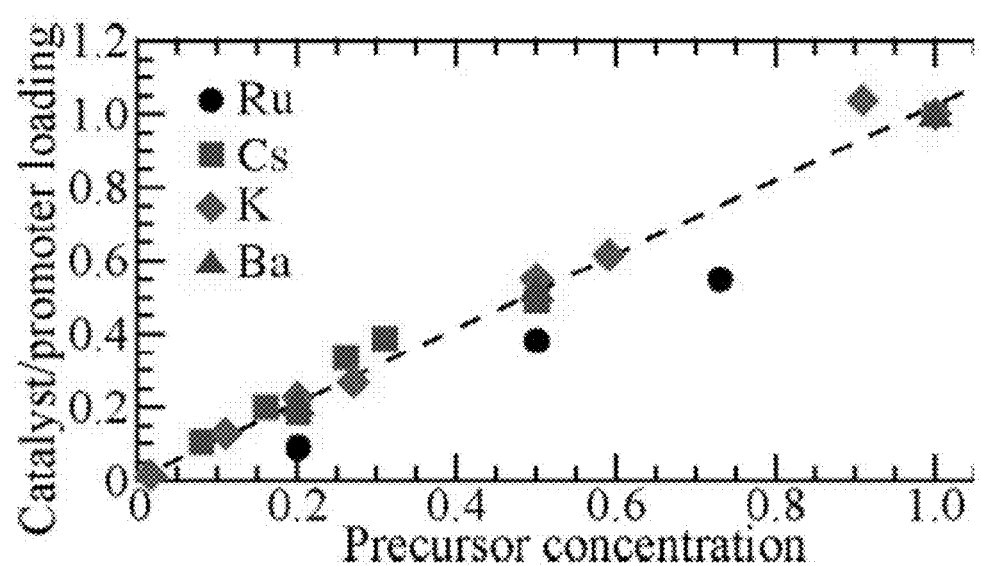
FIG. 12 shows normalized loading of catalyst/promoters as a function of normalized precursor concentration for Ru, Cs, K, and Ba.

The Ru catalyst was loaded into the porous structures using wet impregnation. The 0.67 M Ru precursor solution was synthesized from Ru chloride hydrate (metal 40%) dissolved in 75% acetone (99.5%) and 25% deionized water. After reducing Ru chloride at 400° C. and atmospheric pressure in pure $H_2$ for 2 hours (h) in a Lindberg M furnace, the Ru catalyst was washed using DI water to remove unreduced Ru chloride and then dried in air at 130° C. Several promoters, including Cs, K, and Ba, were loaded individually, following the same impregnation method as used for the Ru catalyst. The promoter precursor solution was prepared using Cs (99.99%), K, and Ba (99.999%) nitrate dissolved in DI water. The Ru catalyst and promoter loadings were determined gravimetrically. As a consequence of the support's low surface area, a typical Ru loading is in the range of $0.4 \leq wt\% \leq 1.0$. The promoter loading was controlled by varying the concentration of the precursor solution to adjust the promoter/catalyst molar ratio (see, for example, FIG. 12). FIG. 12 shows normalized loading of catalyst/promoters as a function of normalized precursor concentration for Ru, Cs, K, and Ba displaying the nominally linear relationship between loading and precursor concentration.

Figure 1B:
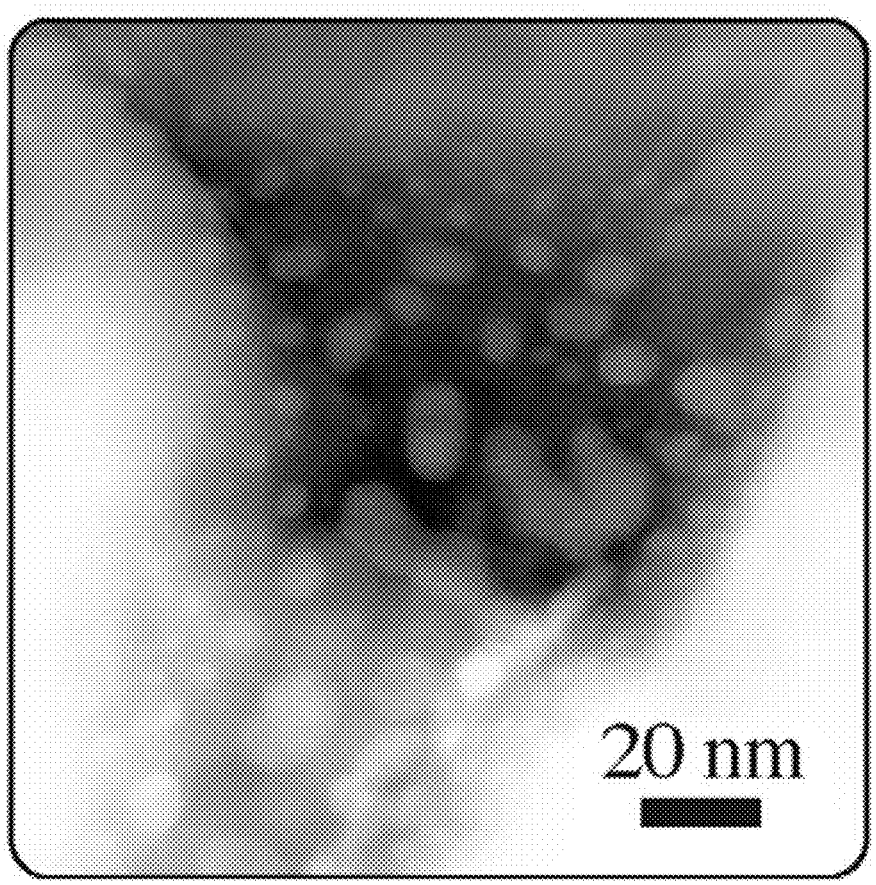
FIG. 1B shows an illustrative transmission electron microscope (TEM) image of a YSZ/Ru/Ba catalyst in accordance with embodiments of the present disclosure.
Figure 1C:
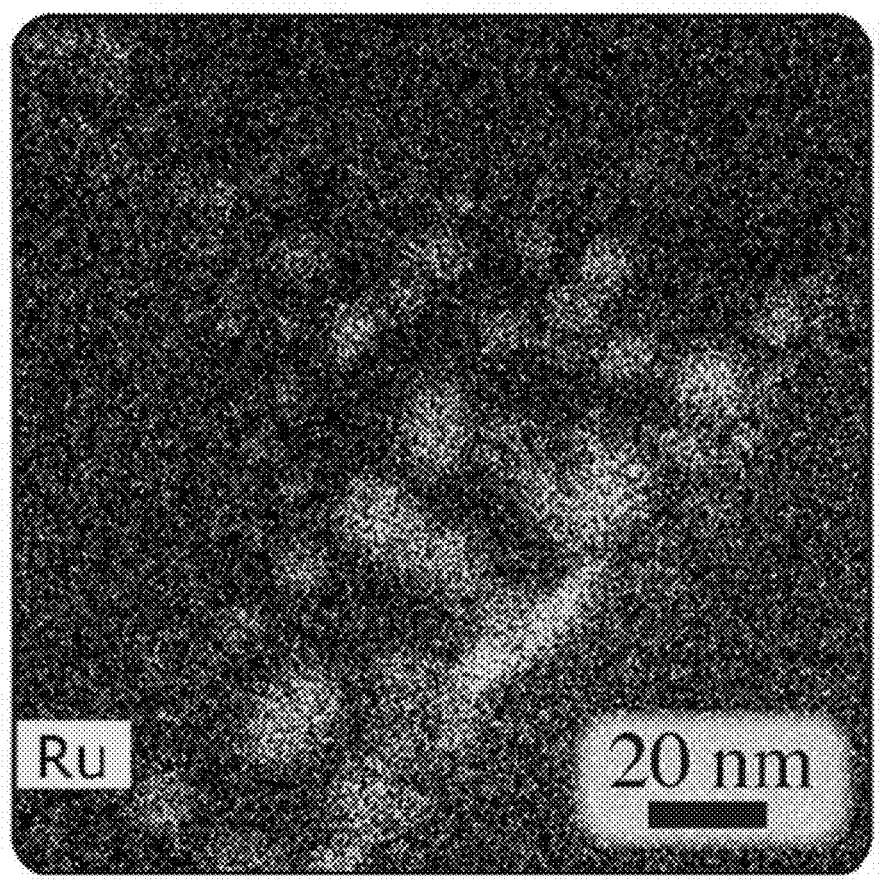
FIG. 1C shows an illustrative Energy Dispersive X-Ray Analysis (EDAX) map of the Ru distributions in the region of the TEM image of FIG. 1B in accordance with embodiments of the present disclosure.
Figure 1D:
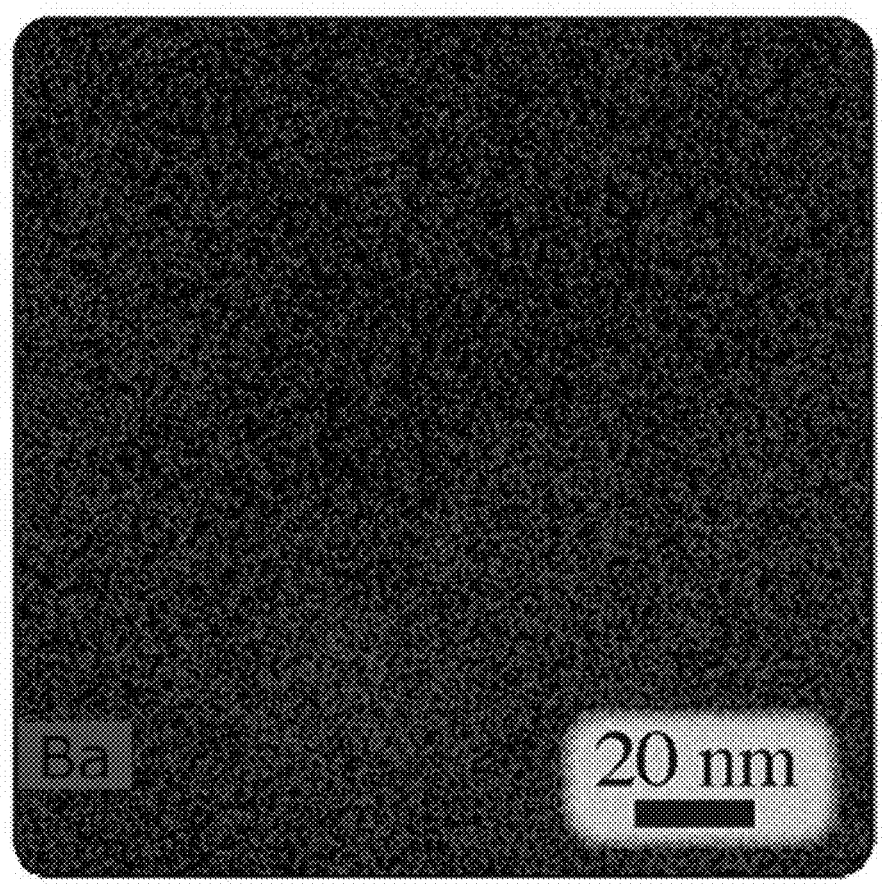
FIG. 1D shows an illustrative EDAX map of the Ba distributions in the region of the TEM image of FIG. 1B in accordance with embodiments of the present disclosure.

FIG. 1B shows an illustrative transmission electron microscope (TEM) image of a YSZ/Ru/Ba catalyst in accordance with embodiments of the present disclosure. FIG. 1C shows an illustrative Energy Dispersive X-Ray Analysis (EDAX) map of the Ru distributions in the region of the TEM image of FIG. 1B. FIG. 1D shows an illustrative EDAX map of the Ba distributions in the region of the TEM image of FIG. 1B. As shown in FIGS. 1C and 1D, the Ru is dispersed as nanoparticles ranging from 2 to 10 nanometers (nm), while the Ba is distributed nominally uniformly over the support.

The Ru particle size distribution was determined using TEM (as shown in FIGS. 1B and 1C) and quantified. The average Ru particle size was found to be 5.6±3.4 nm, corresponding to approximately 23% dispersion, which is the size range that includes dense BS sites that are active for $N_2$ dissociation and facilitate the $NH_3$ synthesis chemistry. Promoters such as Ba have a uniform distribution over the support and not preferentially associated with Ru, as shown in FIG. 1D.

Tubular Configuration

Figure 2:
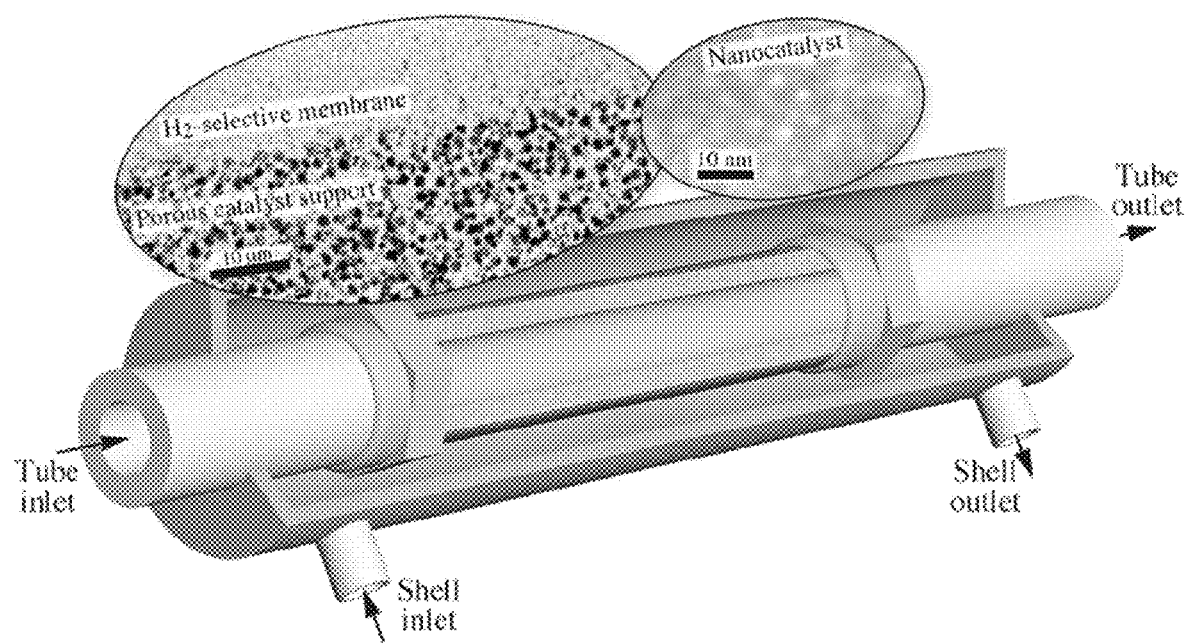
FIG. 2 shows a catalytic membrane reactor in accordance with embodiments of the present disclosure.

Initial studies were accomplished using a modified catalytic membrane reactor. FIG. 2 shows a catalytic membrane reactor. Some of the experiments in the present disclosure use the shell and tube configuration and some use the porous tube alone without the membrane. As illustrated in FIG. 2, the tubular catalyst, which is connected to a ¼ inch (in.) stainless steel feed tube, was mounted inside a 1 in. diameter stainless steel shell. This tubular configuration is a geometry that can be used for ammonia synthesis in a catalytic membrane reactor (CMR). Without a membrane, however, the $N_2/H_2$ gases can be directed through either the shell side or tube side.

Figure 3:
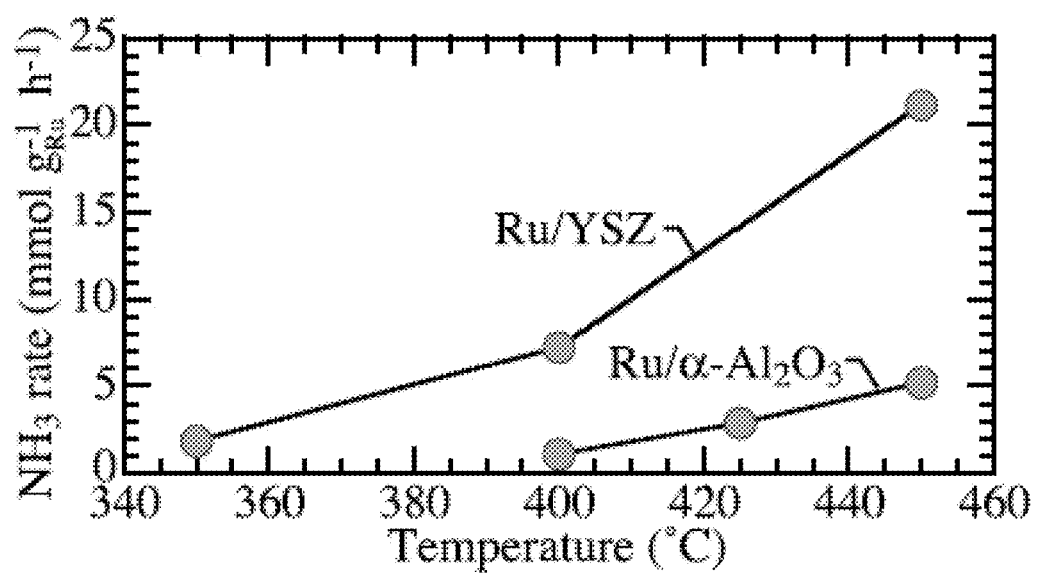
FIG. 3 shows Specific $NH_3$ synthesis rates of Ru supported on YSZ and $\alpha$-$Al_2O_3$ in accordance with embodiments of the present disclosure.

Alternative flow configurations were tested and shown to achieve about the same $NH_3$ synthesis rate (for example, having less than 10% variation). For the results discussed herein, $H_2$ was introduced through the shell side and forced to flow across the catalyst while $N_2$ was introduced through the tube side at a gas hourly space velocity of 13000 $h^{-1}$. This tubular configuration was used to collect preliminary data on supports and promoters as shown in FIGS. 3-5.

Packed-Bed Configuration

For the highly active promoted catalysts, both equilibrium and transport limitations were found to impact the results at the gas hourly space velocity (GHSV) of 13000 $h^{-1}$. In the tubular experiments, the GHSV could not be substantially increased with the existing equipment. Thus, subsequent studies were accomplished in a conventional differential packed-bed reactor (PBR), which also facilitated direct comparison with literature reports on other catalysts. The catalysts for PBR studies were first prepared in the tubular configuration and then crushed and sieved. Particle diameters in the range of $250 \leq d_p \leq 600$ μm were selected to eliminate internal mass transfer limitations. The catalyst particles were packed with quartz wool and glass beads (having particle diameters of 2 mm) inside a ⅜ in. Swagelok VCR® cell with a typical catalyst loading of approximately 0.2 g. The ratio of glass beads and active catalyst was approximately 8.2. The catalyst bed was 2 cm long, with quartz wool supports on both ends of the active catalysts. Feed streams of $H_2$ and $N_2$ were mixed by a tube union tee prior to entering the packed bed. The PBR configuration was used to collect the data in FIGS. 6-9, which became an illustrative basis for the microkinetic model as discussed in relation to FIGS. 7-11.

Space Velocities

This disclosure uses two terminologies to describe the total flow rates and the relationship with the catalyst loading. The gas hourly space velocity (GHSV), which is the ratio of the total volumetric flow rate $Q_{in}$ and the catalyst-bed volume $V_{cat}$ at standard conditions (p=1 bar absolute, T=273 Kelvin (K)), may be evaluated as shown in Equation (1):

$$GHSV = \frac{Q_{in}}{V_{cat}} \quad (1)$$

The GHSV is measured as $h^{-1}$. A GHSV of 10000 $h^{-1}$ is commonly cited in the literature as being sufficient to eliminate external mass transfer limitations. On the basis of this consideration, the initial experiments reported herein evaluating different supports and promoters were conducted in the tubular configuration at GHSV=13000 $h^{-1}$, where the volume of the catalyst bed is defined as total volume of the YSZ ceramic $V_{cat}=\pi(r_0^2-r_1^2)L$, where $r_0$ and $r_1$ are the outer and inner radii of the tubular reactor and L is the length.

The alternative terminology used is space velocity (SV), which is defined as the ratio of the total inlet flow rate at standard conditions and the catalyst loading $m_{cat}$ as measured in grams of active catalyst, as shown in Equation (2):

$$SV = \frac{Q_{in}}{m_{cat}} \quad (2)$$

Figure 13:
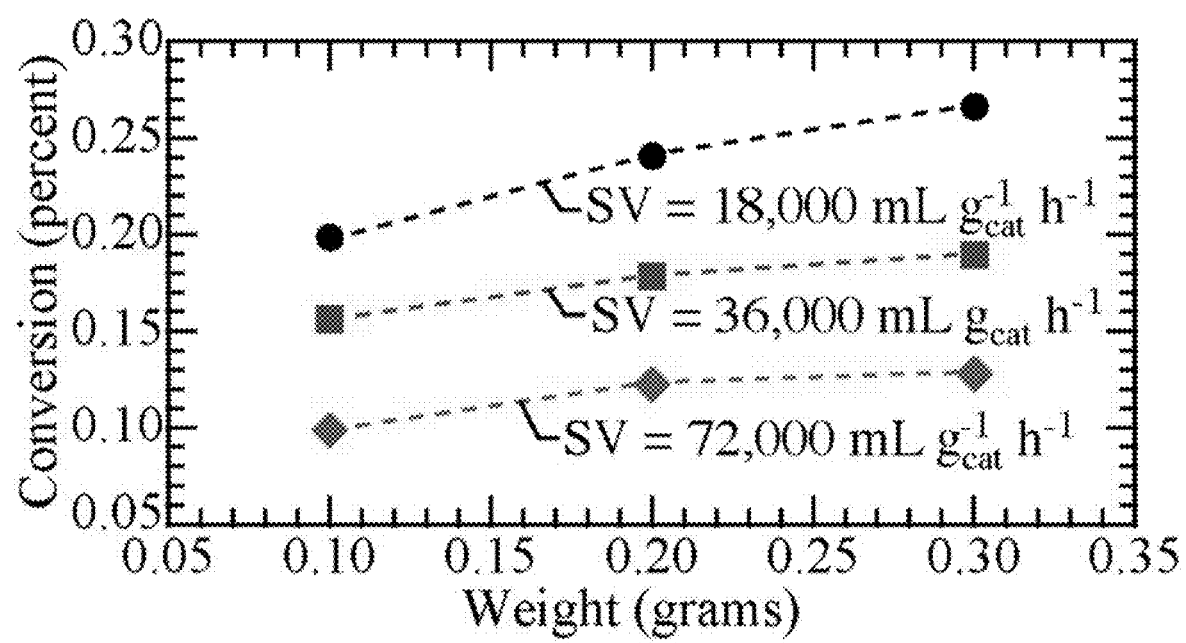
FIG. 13 shows conversion as a function of the catalyst weight.

The SV is represented as mL $g_{cat}^{-1}h^{-1}$. The space velocity for experiments conducted in the PBR configuration is reported in these units because of the ease and accuracy of measuring the catalyst mass. For comparison, the GHSV=13000 $h^{-1}$ condition used in the tubular configuration is equivalent to SV=4500 mL $g_{cat}^{-1}h^{-1}$. The PBR configuration increased the attainable space velocity range by more than an order of magnitude to a maximum of SV=144000 mL $g_{cat}^{-1}h^{-1}$. At space velocities of 72000 mL $g_{cat}^{-1}h^{-1}$ or greater, the ammonia-synthesis rate was found to be insensitive to the feed flow rate (see, for example, FIG. 13). FIG. 13 shows conversion as a function of the catalyst weight. In FIG. 13, the flowrate is adjusted to keep space velocity constant including 18,000, 36,000, and 72,000 mL $g_{cat}^{-1}h^{-1}$, for 0.1, 0.2, and 0.3 g in catalyst weight, separately. At 18,000 and 36,000 the rate slowly increases with catalysts wright whereas at 72,000 mL $g_{cat}^{-1}h^{-1}$ the rate saturates with mass. Reaction conditions in FIG. 13 are P=10 bar (gauge), $H_2/N_2$=3, T=450° C.

The PBR experiments reported herein all used SV=72000 mL $g_{cat}^{-1}h^{-1}$.

Gas-Composition Measurement

The catalyst was heated to the desired temperature (300-450° C.) under $H_2$ at a ramp rate of 3.6 K min$^{-1}$. A type-K thermocouple was placed in the middle of the catalyst bed/oven. The catalyst bed is short relative to the heating zone, ensuring isothermal conditions. The gauge pressure was controlled through an electronic back pressure regulator and varied in the range of 0≤p≤10 bar. The flow rates of $H_2$ and $N_2$ were varied using mass flow controllers, and the outlet flow rate was determined using a bubble flow meter. An oxygen trap was used to lower the inlet oxygen/water concentration of the inlet to below 2 ppb. The outlet composition was measured using a quadrupole mass spectrometer (MS) and a nondispersive infrared detector (NDIR). The MS measures the $N_2$, $H_2$, and $NH_3$ concentrations, and the $NH_3$ concentration is measured by NDIR. Both detectors were calibrated using a gas mixture of 1% $NH_3$ in $H_2/N_2$. Data were logged every 5 min.

Microkinetics Reaction Mechanism

The reaction mechanism is developed using data from the packed-bed experiments and a packed-bed model. The model is used as the basis to interpret measurements and establish kinetics rate expressions. An important contribution of the present model is the development of coverage-dependent rate expressions that span ranges of operating temperature and pressure.

Packed-Bed Model

The isothermal and isobaric packed-bed model solves mass-conservation equations within the packed bed. This model neglects stream wise diffusive transport. In summary form, the relevant differential equations are shown in Equations (3) through (6) as follows:

$$\frac{d(\rho u)}{dz} = A_s \sum_{k=1}^{K_g} \dot{s}_k W_k \quad (3)$$

$$\rho u \frac{dY_k}{dz} + A_s Y_k \sum_{k=1}^{K_g} \dot{s}_k W_k = A_s \dot{s}_k W_k, (k = 1, \ldots, K_g) \quad (4)$$

$$\rho = \frac{p}{RT} \frac{1}{\sum_{K_g} Y_k / W_k} \quad (5)$$

$$\dot{s}_k = 0 \; (k = K_g + 1, \ldots, K_g + K_s) \quad (6)$$

In Equations (3) through (6), $\rho$ is the gas-phase mass density, u is the superficial velocity, $A_s$ is the specific catalyst surface area (e.g., surface area per unit volume of bed), $\dot{s}_k$ is the molar production rate of gas-phase species via a heterogeneous reaction, $W_k$ is the gas-phase species molecular weight, and $Y_k$ is the gas-phase mass fraction. There are $K_g$ gas-phase species and $K_s$ surface-adsorbed species. As shown in Table 1, below, the rate expressions are evaluated.

TABLE 1

| reaction | A (cm, s) | β | E (kj mol$^{-1}$) |
| --- | --- | --- | --- |
| 1 $N_2$ + 2(Ru) → N(Ru) + N(Ru) (sticking coefficient) | 2.892 × 10$^{-6}$ | 0.000 | 38.949 |
| 2 N(Ru) + N(Ru) → $N_2$ + 2(Ru) | 2.015 × 10$^{+17}$ | −0.279 | 148.027 − 14$\theta_{N(Ru)}$ |
| 3 $H_2$ + 2(Ru) → H(Ru) + H(Ru) (sticking coefficient) | 4.007 × 10$^{-3}$ | 0.000 | 0.0 |
| 4 H(Ru) + H(Ru) → $H_2$ + 2(Ru) | 3.600 × 10$^{+20}$ | 0.658 | 91.948 − 2$\theta_{H(Ru)}$ |
| 5 $NH_3$ + (Ru) → $NH_3$(Ru) (sticking coefficient) | 1.247 × 10$^{-5}$ | 0.000 | 0.0 |

TABLE 1-continued

| reaction | A (cm, s) | β | E (kj mol$^{-1}$) |
|---|---|---|---|
| 6  NH$_3$(Ru) → NH$_3$ + (Ru) | 2.235 × 10$^{+11}$ | 0.083 | 83.536 |
| 7  N(Ru) + H(Ru) → NH(Ru) + (Ru) | 8.424 × 10$^{+20}$ | 0.000 | 83.620 − 7θ$_{N(Ru)}$ |
| 8  NH(Ru) + (Ru) → N(Ru) + H(Ru) | 6.813 × 10$^{+19}$ | 0.207 | 30.972 + 1θ$_{H(Ru)}$ |
| 9  NH(Ru) + H(Ru) → NH$_2$(Ru) + (Ru) | 4.949 × 10$^{+19}$ | 0.083 | 75.236 |
| 10 NH$_2$(Ru) + (Ru) → NH(Ru) + H(Ru) | 8.321 × 10$^{+19}$ | −0.083 | 15.767 + 1θ$_{H(Ru)}$ |
| 11 NH$_2$(Ru) + H(Ru) → NH$_3$(Ru) + (Ru) | 3.886 × 10$^{+19}$ | 0.083 | 17.036 |
| 12 NH$_3$(Ru) + (Ru) → NH$_2$(Ru) + H(Ru) | 1.478 × 10$^{+20}$ | 0.000 | 64.980 + 1θ$_{H(Ru)}$ |

Table 1 shows microkinetic reaction mechanisms for Ammonia formation and decomposition over Ba—Ru/YSZ catalysts. The surface site density is taken to be Γ=2.6079× 10$^{-9}$ mol/cm$^2$. The rate expression parameters are stated in consistent units of cm, s, and kJ mol$^{-1}$, with particulars depending on reaction order. Although the model could be extended to include axial diffusive transport as well as temperature and pressure variations, such extensions are not needed for the flow conditions in the experiments of the present disclosure.

The species production rates are evaluated using the reaction mechanism and the local conditions within the bed. In addition to the gas-phase mass fractions $Y_k$, the dependent variables include the surface coverage $\theta_k$ for each of the $K_s$ surface-adsorbed species. Equation (6) is an algebraic constraint that requires the local steady-state production rates of the surface adsorbates to vanish, and Equation (6) depends on the surface coverages as well as the gas-phase composition. Equation (6) runs only over the $K_s$ surface species. The surface reactions cause net production rates for gas-phase species (e.g., $\hat{s}_k \neq 0$ for the $K_g$ gas-phase species). By sign convention, $\hat{s}_k \geq 0$ means that the surface reactions deliver species k into the gas phase. The governing equations form an initial value problem in differential-algebraic form that is easily solved computationally. Applicable software includes the "ode15i" function in MATLAB®. The inlet composition and velocity form the initial conditions. The pressure, temperature, and specific catalyst surface area are specified.

Reaction Pathways and Rate Expressions

The reaction pathways may be referred to as the Ertl mechanism), which was developed in 1996 to represent the ammonia synthesis over Cs—Ru/MgO catalysts. Although the reaction pathways are unchanged, the rate expressions are modified significantly to represent the Ba—Ru/YSZ catalysts over wide ranges of temperature (300≤T≤450° C.), inlet composition (0.1≤H$_2$/N$_2$≤3.0), and pressure (0≤p≤10 bar gauge). Maintaining thermodynamic consistency (microscopic reversibility) is an important aspect of establishing the rate expressions. Thermodynamic consistency was ensured using a least-squares technique to minimize the Gibbs free energy over the relevant temperature range. The model is well suited to predict both ammonia synthesis and decomposition.

The present model discussed herein uses the mean-field approximation, thus assuming that the Ru is uniformly distributed on the catalyst surface. The surface is characterized by Ru site density and the adsorbate site coverages. Table 1 shows the 12-step reaction mechanism among five surface and three gas-phase species. Some of the rate expressions are written in Arrhenius form as Equation (7):

$$k_i' = A_i T^{\beta_i} \exp\left(-\frac{E_i}{RT}\right) \quad (7)$$

Nominal values for the rate constants are estimated using transition-state theory. The pre-exponential factor A is initially evaluated as shown in Equation (8):

$$A = \frac{k_B T}{h} \frac{1}{\Gamma^{n-1}} \quad (8)$$

where $k_B$ is the Boltzmann constant, h is the Planck constant, Γ is the Ru surface site density (Γ=2.6×10$^{-9}$ mol cm$^{-2}$), and n is the reaction order. For a first-order surface reaction, the nominal value of A is estimated to be approximately 10$^{13}$ s$^{-1}$. However, the pre-exponential factors are all empirically adjusted to satisfy thermodynamic consistency and to represent the experimental measurements.

Three of the rate expressions (Reactions 1, 3, and 5 in Table 1) are represented as sticking coefficients, which may be activated. The sticking coefficient may be represented in terms of the collision frequency as shown in Equation (9):

$$\gamma_i = a_i T^{\beta_i} \exp\left(\frac{E_i}{RT}\right) \quad (9)$$

The forward rate expression can be evaluated as shown in Equation (10):

$$k_{f,i} = \frac{\gamma_i}{\Gamma^m} \sqrt{\frac{RT}{2\pi W_k}} \quad (10)$$

where $W_k$ is the molecular weight of the relevant gas-phase species (e.g., N$_2$ in Reaction 1 in Table 1). The exponent m indicates the number of adsorption sites that participate in the reaction (e.g., m=2 for Reaction 1 in Table 1).

Reactions 2, 4, 7-9, and 12 in Table 1 use coverage dependent activation energies, which is an important element in representing kinetics over the range of relevant temperatures. To include coverage-dependent activation energies, the typical Arrhenius expression is modified as shown in Equation (11):

$$k_i = k_i' \prod_{k=1}^{K} \exp\left(-\frac{\varepsilon_{k,i} \theta_k}{RT}\right) \quad (11)$$

where $\theta_k$ is a species coverage fraction and $\varepsilon_{k,i}$ is the coverage dependent activation energy corresponding to the kth species in the ith heterogeneous reaction. The present reaction mechanism considers only H(Ru) and N(Ru) as possibly contributing to the coverage-dependent activation energies.

Rate-Expression Fitting

Although the present disclosure uses the reaction pathways shown in Table 1, the rate expressions and parameters are qualitatively and quantitatively quite different. The rate parameters are fit to be consistent with measured performance of the Ba—Ru/YSZ catalyst over relevant ranges of physical parameters and operating conditions as shown in Table 2. Throughout the fitting process, the physical properties of the catalysts and the packed bed are fixed.

TABLE 2

| parameters | values |
|---|---|
| temperature | $300 \leq T \leq 450°$ C. |
| pressure (gauge) | $0 \leq p \leq 10$ bar |
| inlet velocity | $1.14 \leq U_{in} \leq 15.84$ cm s$^{-1}$ |
| inlet stoichiometry | $0.1 \leq H_2/N_2 \leq 3.0$ |
| catalyst bed length | $L = 2.0$ cm |
| bed inner diameter | $D = 9.525$ mm |
| bed porosity | $\phi = 0.70$ |
| bed tortuosity | $\tau = 2.5$ |
| average particle diameter | $d_p = 430$ μm |
| specific surface area | $A_s = 3.0 \times 10^3$ cm$^{-1}$ |

The pre-exponential factors and the activation barriers are adjusted to preserve overall thermodynamic consistency in the temperature range of $50 \leq T \leq 1100°$ C. In principle, activation barriers can assigned to any value that is consistent with transition-state theory. However, the range of activation barriers are adjusted to be nominally consistent with prior literature.

The iterative fitting procedure is semiautomated but does require some chemical insight and judgment to choose the initial values, propose rate-determining steps, anticipate coverage dependencies, etc. Although adjusting the rates to represent the experimental data and enforce thermodynamic consistency is a lengthy process, software may be used to assist the iteration procedure. Although the specific rate parameters (as shown in Table 1) may not be entirely unique, the holistic mechanism does represent the Ba—Ru/YSZ catalyst behavior accurately over relevant operating conditions.

Table 1 uses rate expressions that are different from Ertl's initial model. The present Ba—Ru/YSZ reaction mechanism uses a significantly higher $N_2$ sticking coefficient than does the Ertl model for Cs—Ru/MgO catalysts. The measured and calculated ammonia formation rates in the present study are approximately seven times higher than those for the Cs—Ru/MgO catalysts. On the basis of the present experimental data, the nitrogen sticking coefficient is found to be $2.89 \times 10^{-6}$. Depending on the support, the $N_2$ sticking coefficient on supported Ru catalysts varies.

The $N_2$ sticking coefficients are $10^{-15}$ for Ru/Al$_2$O$_3$, $10^{-13}$ for Ru/MgO, and $5 \times 10^{-11}$ for Cs—Ru/MgO at room temperature via $N_2$ temperature-programmed desorption measurements. There may be a linear correlation observed between the $N_2$ sticking coefficient and ammonia formation rate. Potentially, because only a small fraction of catalyst surface was active, the $N_2$ sticking coefficients should be low. The nitrogen sticking coefficient can be as high as $10^{-5.4}$ on the 1% of the Ru/MgAl$_2$O$_4$ surface's Ru(001) step sites.

Ertl's microkinetic model includes the recombination of adsorbed nitrogen (Reaction 2 in Table 1), which is reported to be energetically the most stable (137 kJ mol$^{-1}$) reaction step. Adsorption and desorption energy barriers of $N_2$ vary depending on the support as well. Isotopic exchange studies show that $N_2$ adsorption energy for Cs—Ru/MgO is 33 kJ mol$^{-1}$, and the desorption energy is 137 kJ mol$^{-1}$, whereas on Ru/MgO, the adsorption energy is 48 kJ mol$^{-1}$ and desorption energy is 158 kJ mol$^{-1}$. The barrier for nitrogen desorption in various embodiments is calculated to be 184 kJ mol$^{-1}$. The present kinetic model uses 38.95 kJ mol$^{-1}$ for $N_2$ adsorption and 148.0 kJ mol$^{-1}$ for the $N_2$ desorption energy barrier.

Results

Effects of Supports and Promoters

Because Ru loadings may vary somewhat as catalysts are prepared in different batches, the measured NH$_3$ production rates reported herein are normalized by the Ru mass (mmol $g_{Ru}^{-1}$h$^{-1}$). FIG. 3 shows specific NH$_3$ synthesis rates of Ru supported on YSZ and α-Al$_2$O$_3$, individually, without any promoter as a function of temperature ($350 \leq T \leq 450°$ C.) and reaction conditions of p=1 bar (gauge), H$_2$/N$_2$=3, and GHSV=13000 h$^{-1}$. FIG. 3 compares the NH$_3$ synthesis rate as a function of temperature at p=0 bar (gauge) using a YSZ support and the more conventional α-Al$_2$O$_3$ support. These measurements were done in the tubular reactor as shown in FIG. 2. The production rates using Ru/YSZ are a factor four greater than those using Ru/α-Al$_2$O$_3$. Moreover, the Ru/YSZ stays active at substantially lower temperatures, below 400° C. An Arrhenius analysis reveals that the YSZ support reduces the apparent activation energy from 123 to 103 kJ mol$^{-1}$. The improved performance is likely due to the strong metal-support interaction associated with the Ru and YSZ. At reaction conditions, partially reduced Zr$_{2+}$ may donate electrons to adjacent Ru atoms, thus enhancing their electron density and facilitating the $N_2$ dissociation step, which is recognized to be the rate-determining step for NH$_3$ synthesis.

Alkali and alkaline-earth metal compounds are known to improve the activity of Ru catalysts by altering their electronic structure. The present disclosure considers three promoters (Cs, K, and Ba) with varying promoter/catalyst molar ratios.

Figure 4A:
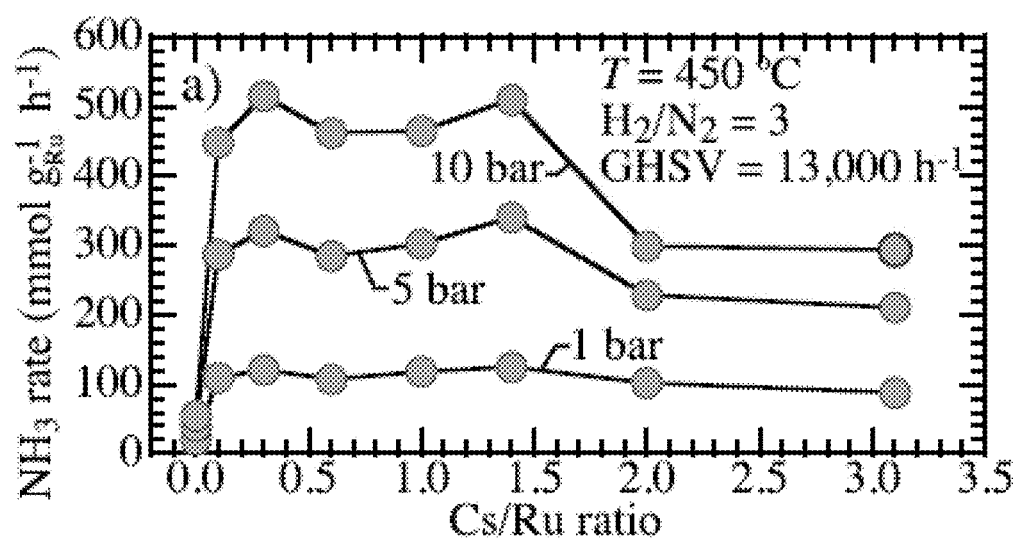
FIG. 4A shows specific $NH_3$ synthesis rates of Ru/YSZ as functions of the Cs/Ru ratio at various pressures in accordance with embodiments of the present disclosure.
Figure 4B:
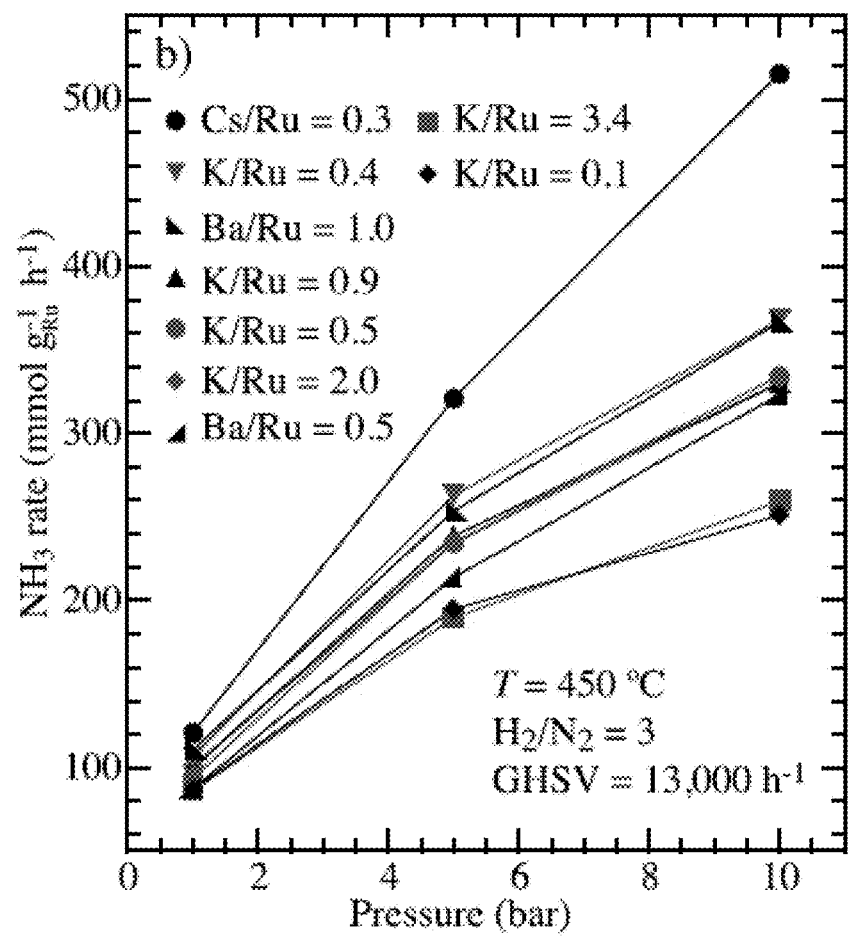
FIG. 4B shows specific $NH_3$ synthesis rates of Ru/YSZ using different promoters and concentrations as functions of pressure in accordance with embodiments of the present disclosure.
Figure 5:
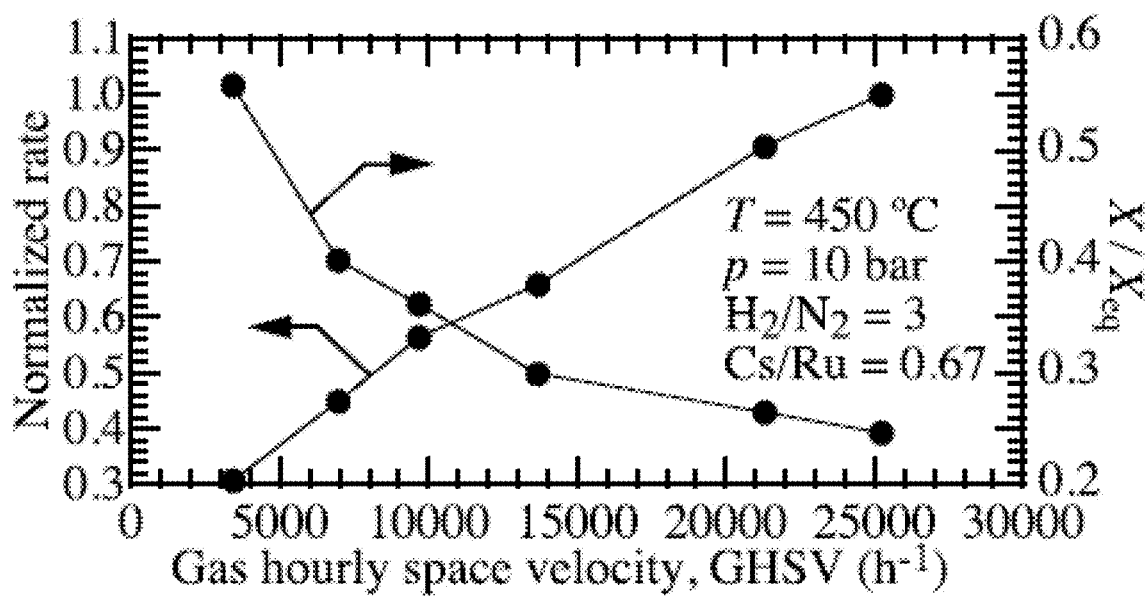
FIG. 5 shows specific $NH_3$ synthesis rate and the ratio of measured $NH_3$ concentration over that at thermodynamic equilibrium ($X/X_{eq}$) as a function of gas hourly space velocity (GHSV) in accordance with embodiments of the present disclosure.

FIG. 4A shows specific NH$_3$ synthesis rates of Ru/YSZ as functions of the Cs/Ru ratio at various pressures ($1 \leq p \leq 10$ bar, gauge). FIG. 4B shows specific NH$_3$ synthesis rates of Ru/YSZ using different promoters and concentrations as functions of pressure ($1 \leq p \leq 10$ bar, gauge) and reaction conditions of T=450° C., H$_2$/N$_2$=3, and GHSV=13000 h$^{-1}$. FIG. 4A shows measured ammonia-synthesis rates at T=450° C., H$_2$/N$_2$=3, and three pressures as functions of the Cs/Ru ratio. Relative to Ru/YSZ alone, the addition of Cs as a promoter increases the reaction rate by almost an order of magnitude. The increased activity is relatively insensitive to the Cs/Ru ratio in the range of $0.1 \leq$ Cs/Ru$\leq 1.4$. The reaction rate decreases somewhat at higher loadings (Cs/Ru>1.4), potentially due to the coverage of active Ru sites by excess promoter. FIG. 4B shows the influence of different promoters and promoter/Ru ratios as functions of pressure. In all cases, the temperature, inlet stoichiometry, and GHSV are fixed. In various embodiments, Cs is the most active. In all cases, the synthesis rates increase nearly linearly as functions of pressure.

Compared to Ru/YSZ, the introduction of Cs reduced the apparent activation energy for ammonia synthesis from 103 kJ to 65 kJ mol$^{-1}$. The Ba and K promoters also significantly enhanced the reaction rate and were insensitive to the promoter/Ru catalyst ratio. At 400° C. and 30 bar, a comparison of the catalytic activity of MgO-supported Ru with the addition of Cs and Ba shows that Cs was twice as active as Ba, which is consistent with the results in the present study. The promoter activity trend (Cs>K≈Ba) correlates with the electronegativity trend (Cs<K<Ba), suggesting that the rate increase associated with the promoter is caused by electron transfer to the Ru.

Space Velocity and Stability

Given the high rates observed on the promoted catalysts, the reaction rates were evaluated as functions of GHSV to determine the extent to which the experiments could be kinetically limited.

FIG. 5 shows specific $NH_3$ synthesis rate (normalized with respect to the maximum GHSV value) and the ratio of measured $NH_3$ concentration over that at thermodynamic equilibrium ($X/X_{eq}$) as a function of GHSV. Measurements were made in a tubular reactor (see, for example, FIG. 2) with reaction conditions of T=450° C., p=10 bar (gauge), $H_2/N_2$=3, and Cs/Ru=0.67. FIG. 5 shows the measured normalized synthesis rates and the extent of conversion relative to equilibrium ($X/X_{eq}$) as functions of GHSV. The apparent reaction rates increase with increasing GHSV, suggesting the possibility of a mass-transport limitation. However, the measured conversions are on the order of equilibrium, suggesting that the synthesis rate at low GHSV could be equilibrium-limited. Thus, the tubular configuration is not suitable for further study of the process kinetics. Consequently, the study of the reaction kinetics was accomplished using measurements from a packed-bed reactor. Using the packed-bed reactor, with the absence of transport limitations, ammonia-synthesis rates were found to be approximately four times higher than those observed in the tubular reactor. Under the packed-bed conditions, although the rates were initially high, the Cs—Ru catalyst was found to be unstable.

Figure 6A:
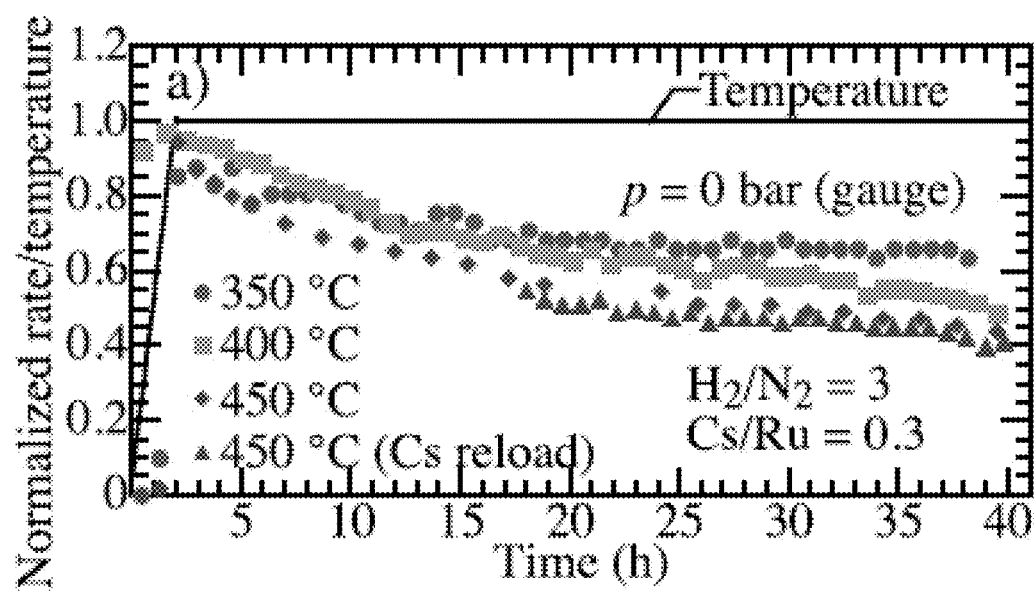
FIG. 6A shows normalized $NH_3$ synthesis rate of Cs-promoted Ru/YSZ over time at various temperatures in accordance with embodiments of the present disclosure.
Figure 6B:
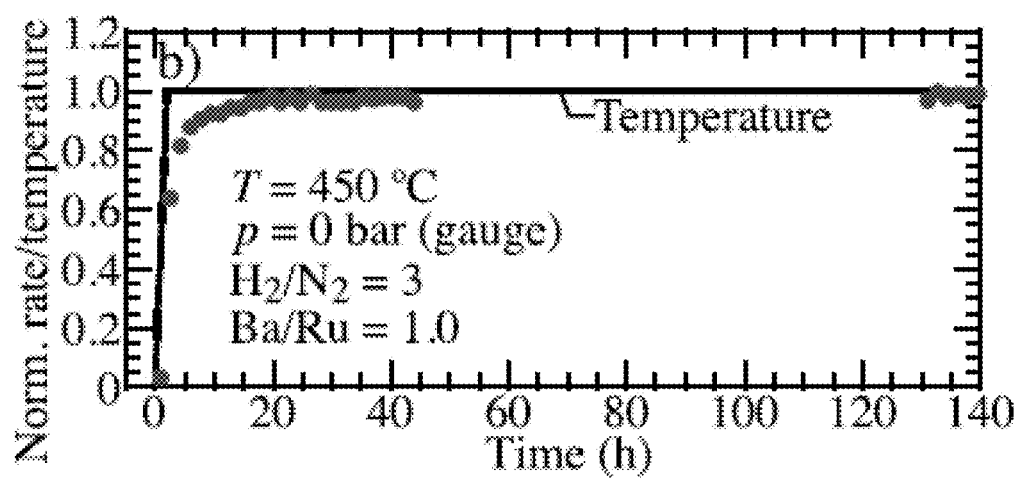
FIG. 6B shows normalized $NH_3$ synthesis rate of Ba-promoted Ru/YSZ over time at 450° C. in accordance with embodiments of the present disclosure.
Figure 14:
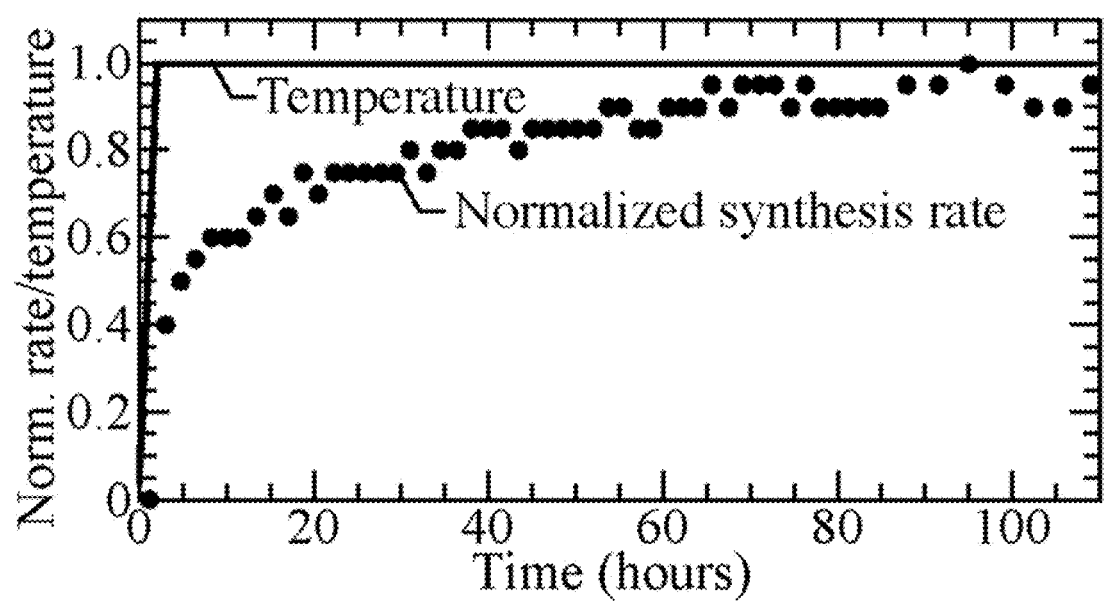
FIG. 14 shows normalized $NH_3$ synthesis rate of Ru/YSZ over time.

FIG. 6A shows normalized $NH_3$ synthesis rate of Cs-promoted Ru/YSZ over time at various temperatures (300≤T≤450° C.). In FIG. 6A, Cs is reloaded after the performance decline of a 20 h test at T=450° C. and reaction conditions are p=0 bar (gauge), $H_2/N_2$=3, SV=72000 mL $g_{cat}^{-1}h^{-1}$, and Cs/Ru=0.3. FIG. 6B shows normalized $NH_3$ synthesis rate of Ba-promoted Ru/YSZ over time at 450° C. with reaction conditions of p=0 bar (gauge), $H_2/N_2$=3, SV=72000 mL $g_{cat}^{-1}h^{-1}$, and Ba—Ru=1.0. FIG. 6A plots the normalized ammonia-synthesis rates for the Cs—Ru catalyst at three temperatures. At T=450° C., the reaction rate declined approximately 50% over 40 h (see, for example, FIG. 6A). Reapplication of Cs restored the rate, but it again declined in a similar manner. The deactivation is apparently thermally activated, with the degradation rate decreasing at lower temperatures. Nevertheless, the degradation rates associated with the Cs may be practically unacceptable in various embodiments. A separate stability test using Ru/YSZ without any promoter confirms the stability of Ru catalyst itself at 450° C. over 100 h (see, for example, FIG. 14). In FIG. 14, the normalized $NH_3$ synthesis rate of Ru/YSZ over time at 450° C. is shown with reaction conditions of p=0 bar (gauge), $H_2/N_2$=3, SV=72,000 mL $g_{cat}^{-1}h^{-1}$. In FIG. 14, the Ru/YSZ takes up to 60 hours of activation to approach its maximum rate but then remains stable.

The Cs promoter was identified to be a source of the instability. In contrast, the Ba—Ru/YSZ remained stable at 450° C. for over 140 h (see, for example, FIG. 6B).

Table 3 lists the melting points of the alkali and alkaline-earth compounds used in the present disclosure, where the oxide is the most likely form at reaction conditions.

TABLE 3

| | nitrate | melting point (° C.) oxide | hydroxide |
|---|---|---|---|
| Cs | 414 | 490 | 342 |
| K | 334 | 360 | 740 |
| Ba | 592 | 1923 | 78 |

The melting point of cesium oxide is only of 490° C., whereas that of barium oxide is much higher at 1923° C. Therefore, the inventors theorize that the Cs promoter, in the form of a low melting point oxide, is mobile on YSZ support. Such mobility is expected to reduce activity over time.

Model-Experiment Comparison for Ba—Ru YSZ

Since the Ba—Ru/YSZ proved to be highly active and stable, it was used to determine the effects of temperature, pressure, and $H_2/N_2$ ratio on ammonia-synthesis rates. The model parameters (shown in Table 1) were based on the experiments, and the subsequent figures compare the experiment with model predictions.

Figure 7:
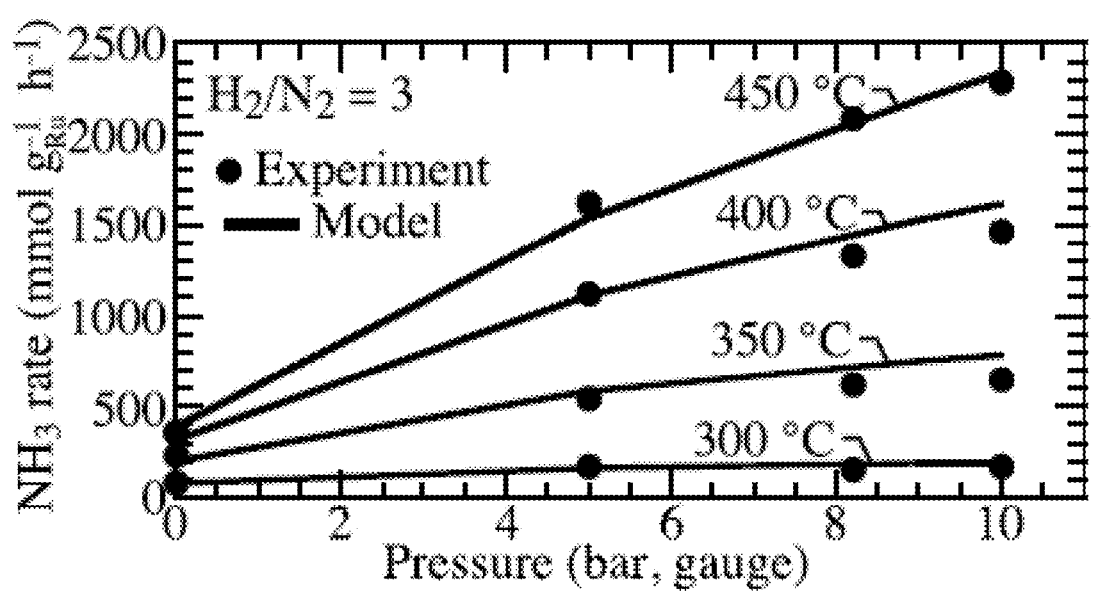
FIG. 7 shows specific $NH_3$ synthesis rate of Ba-promoted YSZ as a function of pressure in accordance with embodiments of the present disclosure.

FIG. 7 shows specific $NH_3$ synthesis rate of Ba-promoted YSZ as a function of pressure (0-10 bar gauge) at various temperatures (300≤T≤450° C.) at stoichiometric $H_2/N_2$, where the solid line is the reaction rate obtained from the microkinetics model and reaction condition are SV=72000 mL $g_{cat}^{-1}h^{-1}$. FIG. 7 shows the ammonia-synthesis rate as a function of pressure at selected temperatures. Other reactor conditions are fixed as $H_2/N_2$=3, T=450° C., and SV=72000 mL $g_{cat}^{-1}h^{-1}$. At the higher temperatures, the $NH_3$ synthesis rate scales approximately linearly with pressure. As the temperature decreases, the benefits of increasing pressure are diminished. At T=300° C., the $NH_3$ synthesis rate is nearly independent of pressure. The model captures these trends.

Figure 8:
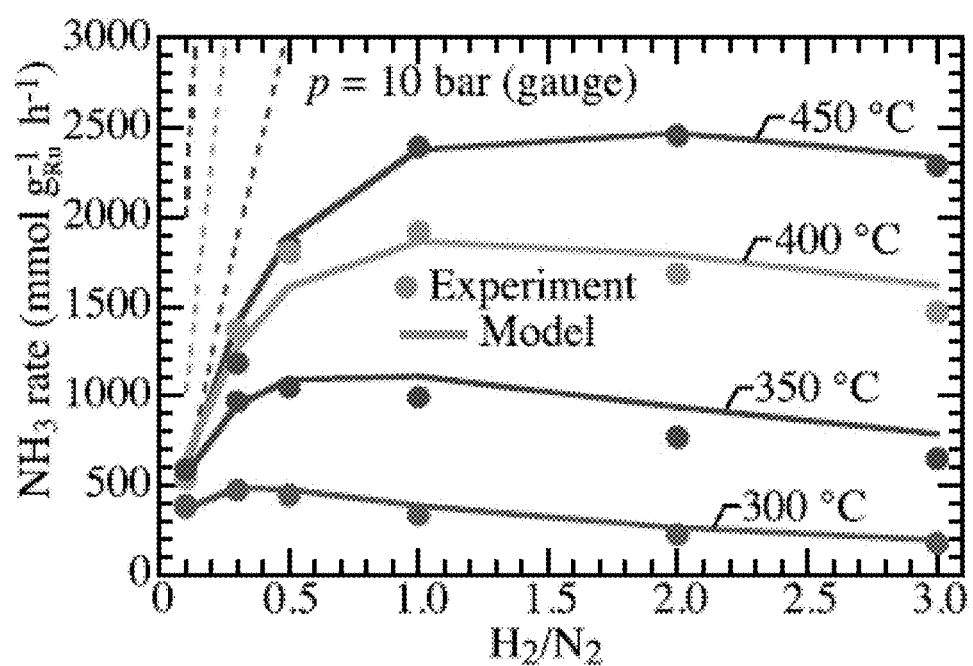
FIG. 8 shows specific $NH_3$ synthesis rate of Ba-promoted YSZ as a function of temperature in accordance with embodiments of the present disclosure.

FIG. 8 shows specific $NH_3$ synthesis rate of Ba-promoted YSZ as a function of temperature (300≤T≤450° C.) using various stoichiometric ratios (0.1≤$H_2/N_2$≤3). In FIG. 8, the solid lines are the reaction rates predicted from the microkinetics model and the dashed lines are the theoretical reaction rates calculated using the $NH_3$ concentration at thermodynamic equilibrium with reactor conditions of p=10 bar (gauge) and SV=72000 mL $g_{cat}^{-1}h^{-1}$. FIG. 8 shows measured and model-predicted ammonia-synthesis rates at p=10 bar (gauge) as functions of inlet $H_2/N_2$ ratios for four temperatures. Depending on the temperature, the synthesis rates achieve a shallow maximum at different feed stoichiometries. As the temperature decreases, the feed stoichiometry to achieve the peak rate decreases as follows: $H_2/N_2$≈2 at T=450° C.; $H_2/N_2$≈1 at T=400° C.; $H_2/N_2$≈0.5 at T=350° C.; $H_2/N_2$≈0.3 at T=300° C. At high temperature and low $H_2/N_2$, the synthesis rate approaches thermodynamic equilibrium. FIG. 8 shows predicted equilibrium rates as dashed lines. The model again captures the observed variations, and as discussed below, the local maxima in synthesis rates arises from a competition between $H_2$ and $N_2$ adsorption rates.

Figure 9:
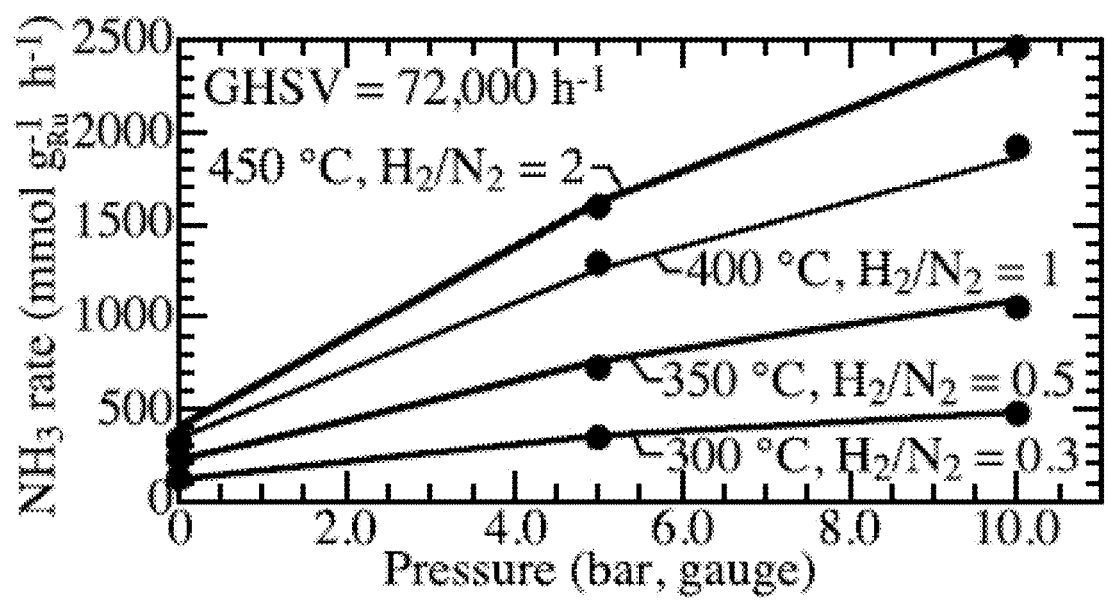
FIG. 9 shows specific $NH_3$ synthesis rate of Ba-promoted YSZ as a function of pressure at various temperatures in accordance with embodiments of the present disclosure.

FIG. 9 shows specific $NH_3$ synthesis rate of Ba-promoted YSZ as a function of pressure (0-10 bar gauge) at various temperatures (300≤T≤450° C.) at optimal $H_2/N_2$ ratios. In FIG. 9, the solid lines are the reaction rates predicted from the microkinetics model and reactor conditions are SV=72000 mL $g_{cat}^{-1}h^{-1}$. FIG. 9 shows the reaction rate as a function of pressure using the optimal $H_2/N_2$ ratio that maximizes the synthesis rate at each temperature. The effect of elevated pressure, especially at low temperature, is stronger when using the optimal feed ratio (see, for example, FIGS. 7 and 9). When using Cs—Ru/MgO at 50 bar and obtaining optimal $H_2/N_2$ ratios of 1.5, 0.43, 0.25, and 0.05 at temperatures of 450, 400, 350, and 300° C., respectively, the optimal $H_2/N_2$ ratios for the Cs—Ru/MgO at each temperature are smaller than they are for the Ba—Ru/YSZ catalyst, suggesting Cs—Ru is more susceptible to $H_2$ poisoning.

DISCUSSION

Role of the Surface Coverages

As discussed in Model-Experiment Comparison for Ba—Ru/YSZ, the model accurately predicts the catalyst performance over wide ranges of temperature, pressure, and stoichiometry. In very large measure, the model's predictive capability was the result of extending the Ertl mechanism by including coverage dependency to the energetics of the surface chemistry.

Figure 10A:
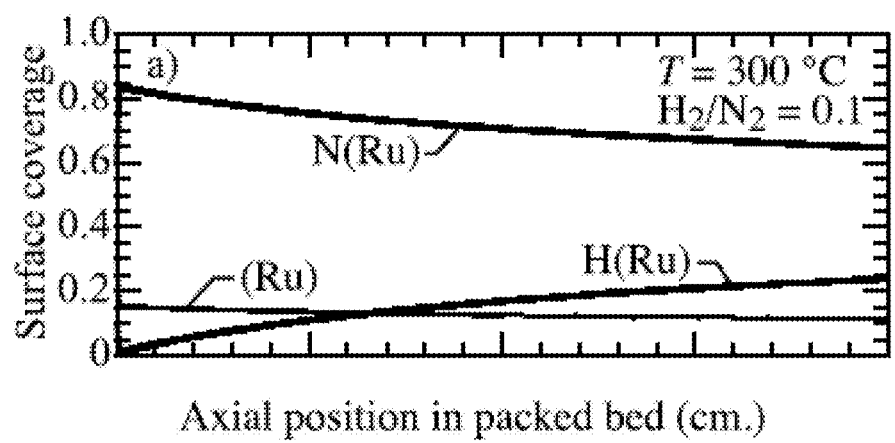
FIG. 10A shows model-predicted surface coverage fractions as functions of position in the packed bed for an $H_2/N_2$ inlet ratio of 0.1 in accordance with embodiments of the present disclosure.
Figure 10B:
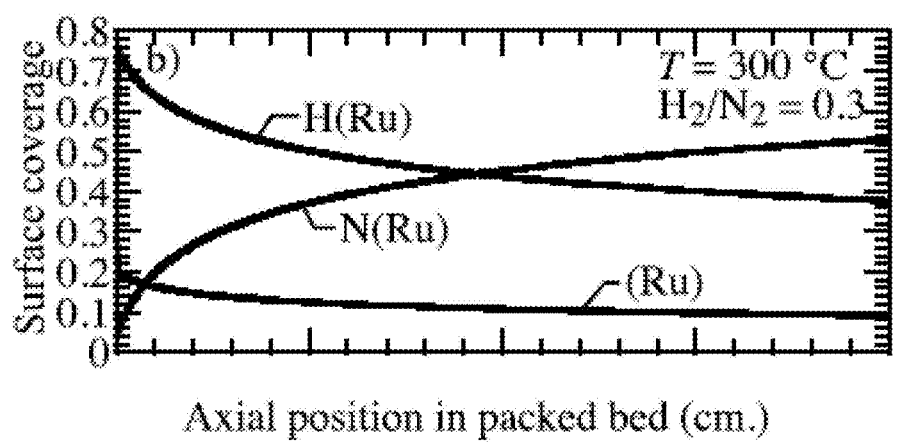
FIG. 10B shows model-predicted surface coverage fractions as functions of position in the packed bed for an $H_2/N_2$ inlet ratio of 0.3 in accordance with embodiments of the present disclosure.
Figure 10C:
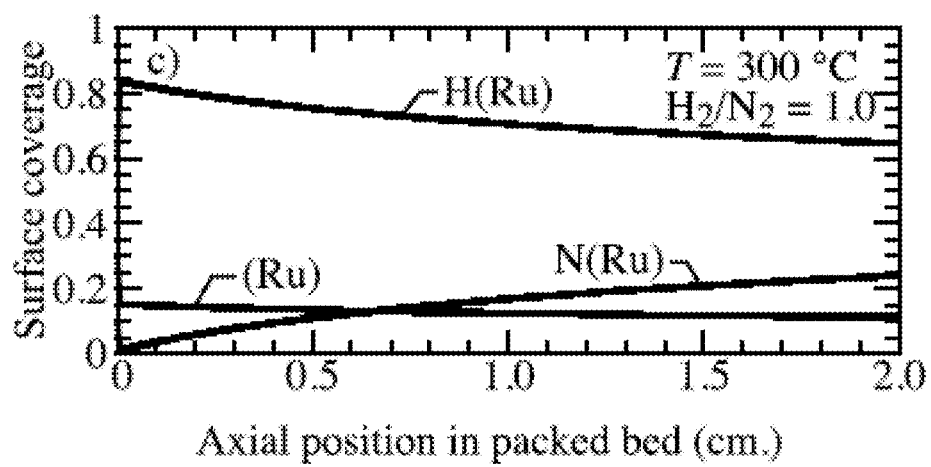
FIG. 10C shows model-predicted surface coverage fractions as functions of position in the packed bed for an $H_2/N_2$ inlet ratio of 1.0 in accordance with embodiments of the present disclosure.

FIGS. 10A, 10B, and 10C show model-predicted surface coverage fractions as functions of position in the packed bed for $H_2/N_2$ inlet ratios of 0.1, 0.3, and 1.0, respectively, with reaction conditions of p=10 bar (gauge), T=300° C., and SV=72000 mL $g_{cat}^{-1}h^{-1}$. At low $H_2/N_2$ ratios (see, for example, FIG. 10A), the surface is mostly covered by adsorbed nitrogen N(Ru). As $H_2/N_2$ increases to 0.3 (see, for example, FIG. 10B), the hydrogen coverage H(Ru) increases and the N(Ru) coverage decreases correspondingly until their levels are comparable, which is coincident with the maximum ammonia formation rates (see, for example, FIG. 8). Further increasing the feed stoichiometry to $H_2/N_2$=1.0 (see, for example, FIG. 10C) causes the surface to be covered mostly by H(Ru), with N(Ru) becoming the rate-limiting reactant. To accommodate wide ranges of $H_2/N_2$, the present model incorporates a coverage dependency of 14 kJ mol$^{-1}$ for the nitrogen desorption (see, for example, Reaction 2 in Table 1).

Although the 14 kJ mol$^{-1}$ emerges from the fitting procedure, independent density functional theory (DFT) models also predict that nitrogen desorption is coverage dependent. At low temperature, this nitrogen coverage dependency, which decreases the N(Ru)+N(Ru) recombination activation barrier as a function of N(Ru) coverage, enables the model to capture this dynamic evolution in surface coverage and accurately predict optimal $H_2/N_2$ ratios.

As the feed $H_2/N_2$ ratio increases from 0.3 to 1.0, the ammonia formation rates decrease as a result of hydrogen poisoning. At high $H_2$ concentration, its high sticking probability of 4×10$^{-3}$ is sufficient to cover the surface as H(Ru). For stoichiometric mixtures, H(Ru) recombinative desorption is the rate-limiting step. As a result, the ammonia formation rates are kinetically controlled. Consequently, increasing pressure does not significantly increase the ammonia formation rate (see, for example, FIG. 7). For these reasons, unlike iron-based catalysts, Ru catalysts tend to operate best below the stoichiometric ratio of $H_2/N_2$=3.0 to avoid the hydrogen surface poisoning effect.

Figure 11A:
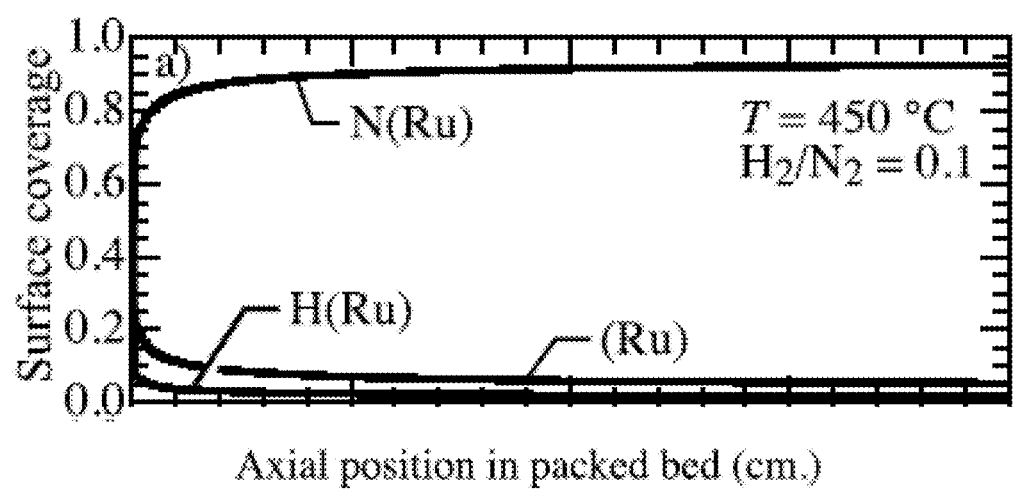
FIG. 11A shows model-predicted surface coverage fractions as functions of the position in the packed bed for an $H_2/N_2$ inlet ratio of 0.1 in accordance with embodiments of the present disclosure.
Figure 11B:
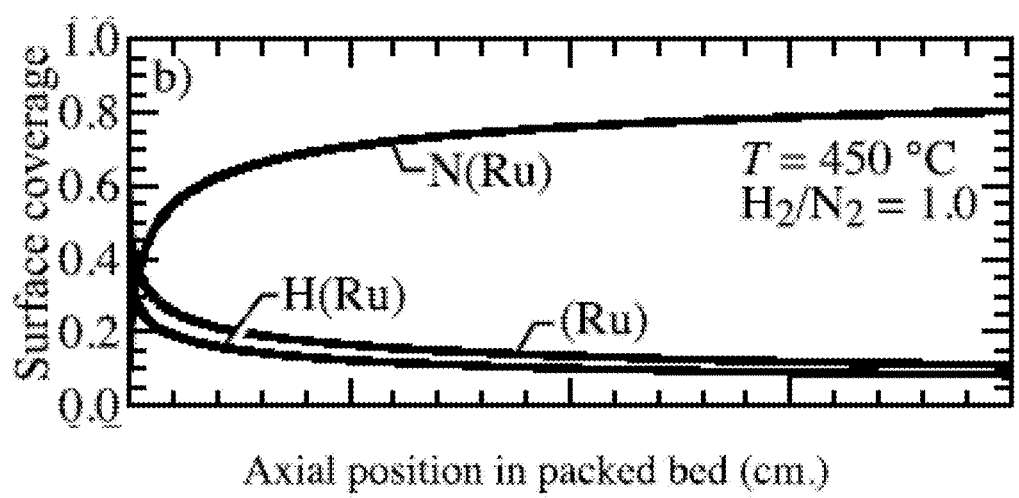
FIG. 11B shows model-predicted surface coverage fractions as functions of the position in the packed bed for an $H_2/N_2$ inlet ratio of 1.0 in accordance with embodiments of the present disclosure.
Figure 11C:
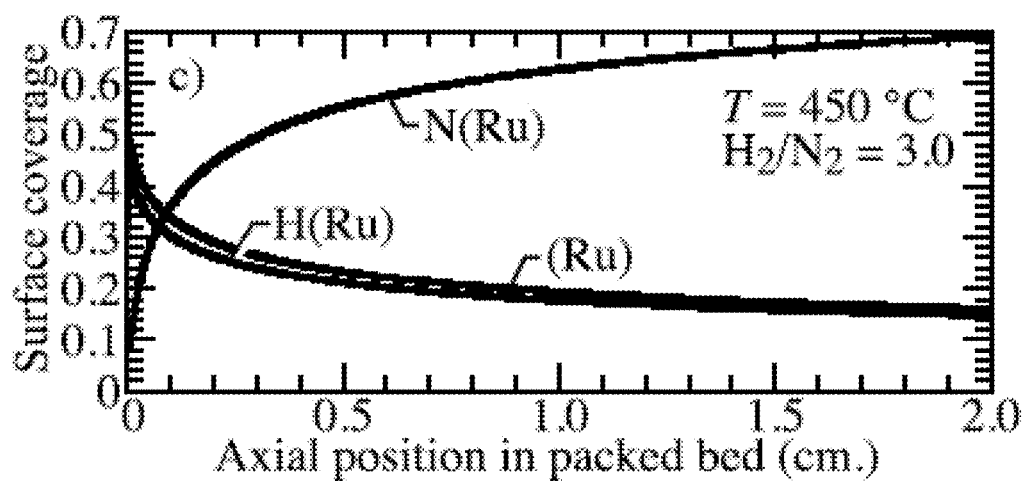
FIG. 11C shows model-predicted surface coverage fractions as functions of the position in the packed bed for an $H_2/N_2$ inlet ratio of 3.0 in accordance with embodiments of the present disclosure.

FIGS. 11A, 11, and 11C show model-predicted surface coverage fractions as functions of the position in the packed bed for the selected $H_2/N_2$ inlet ratios of $H_2/N_2$=0.1, $H_2/N_2$=1.0, and $H_2/N_2$=3.0, respectively, and reaction conditions of p=10 bar (gauge), T=450° C., and SV=72000 mL $g_{cat}^{-1}h^{-1}$. As compared to the operation at 300° C., the H(Ru) and N(Ru) surface coverages at 450° C. are weaker functions of the inlet $H_2/N_2$ ratios. At very low $H_2$ concentrations (e.g., $H_2/N_2$=0.1), FIG. 11A shows that the surface is largely covered by N(Ru), reaching above 90% for most of the bed length. In contrast, the adsorbed hydrogen H(Ru) covers only a small fraction of the surface (H(Ru)≈2%). The ruthenium open site fraction ((Ru)≈5%) is predicted to be greater than the H(Ru) coverage. Thus, at low $H_2/N_2$ ratios, the rate-determining step is the NH formation step (see, for example, Reaction 7 in Table 1). As the feed stoichiometry increases ($H_2/N_2$=1.0 and $H_2/N_2$=3.0; see, for example, FIGS. 11B and 11C), the qualitative coverage trends remain similar to those at $H_2/N_2$=0.1.

A comparison of FIGS. 10A-10C and 11A-11C reveals that the coverage behaviors at 450° C. are qualitatively quite different from the behaviors at 300° C. At 450° C., nitrogen coverage remains dominant even at high $H_2/N_2$ ratios. The temperature-dependent rate for the H(Ru) recombination (see, for example, Reaction 4 in Table 1) is responsible for this behavior. At high temperatures, the hydrogen desorption is enhanced by the Ta factor (see, for example, Equation (7)). As the temperature increases, the hydrogen poisoning effect at high $H_2/N_2$ ratios (e.g., $H_2/N_2$≥1.0) diminishes. The reaction mechanism captures this behavior by introducing a temperature- and coverage-dependent H(Ru)+H(Ru) recombination rate (see, for example, Reaction 4 in Table 1). The coverage-dependent activation energy barrier is decreased by 2 kJ mol$^{-1}$, further decreasing the activation energy for producing available H(Ru) to form NH(Ru). Increasing the H(Ru) coverage leads to an increase of the ammonia formation rates (see, for example, FIG. 8).

Despite the low conversion rates for producing ammonia, FIGS. 10A-10C and 11A-11C show relatively large spatial variations in surface coverages. The model fixes the feed stream composition at the inlet to be a mixture of $H_2$ and $N_2$.

Because of low conversion to $NH_3$, the gas-phase $H_2$ and $N_2$ concentrations vary only slightly along the bed length. Nevertheless, small changes in the gas-phase composition can produce substantial changes in the surface coverages. The net $NH_3$ production rates depend on heterogeneous reactions rates and the activity of gas-phase compounds and surface adsorbates (e.g., mass-action kinetics), but at relatively low pressure and temperature, the $NH_3$ production rates are small.

Comparison with the Literature

Ammonia production is usually normalized by the mass of the catalyst, with the reaction rate being reported as mmol $g_{cat}^{-1}h^{-1}$. The low specific surface area of the YSZ support (2.23 $m^2g_{cat}^{-1}$) used in the present study limits the Ru loading to 0.4≤wt %≤1.0.

To eliminate the impact of different Ru loadings on ammonia-synthesis rate, the present disclosure compares results with literature reports using the specific rate measured as mmol $g_{Ru}^{-1}h^{-1}$. Praseodymium-based supports have registered the highest synthesis rates to date, for example, 1204 mmol $g_{Ru}^{-1}h^{-1}$ at 400° C. and 10 bar (absolute) using $La_{0.5}Pr_{0.5}O_{1.75}$. For the same operating conditions, which importantly includes an identical SV of 72000 mL $g_{cat}^{-1}h^{-1}$, the specific $NH_3$ synthesis over Ba—Ru/YSZ was approximately 1410 mmol $g_{Ru}^{-1}h^{-1}$ (see, for example, FIG. 7).

The high synthesis rates are attributed to a combination of fine Ru particles with dense active sites, electronic-structure modification by the Ba promoter, and the strong metal-support interaction. Table 4 summarizes the activation energies observed over various supports; in particular, the apparent activation energy ($E_a$) of Ru-based catalysts.

TABLE 4

| catalyst | $E_a$ |
| --- | --- |
| Ba—Ru/YSZ | 46.2 |
| Ru/YSZ | 103.0 |
| Ru/CaO | 120.1 |
| Ba—Ru/AC | $72.5 \leq E_a \leq 88.8$ |
| Cs—RU/MgO | $73.0 \leq E_a \leq 85.8$ |
| Ru/C12A7:$O^{2-}$ | 104.6 |
| Ru/C12A7:$e^-$ | $40.0 \leq E_a \leq 56.0$ |

For Ba—Ru/YSZ and Ru/YSZ in the present work, the reaction conditions are $300 \leq T \leq 450°$ C., p=0 bar (gauge), and $H_2/N_2$=3. For the other Ru-based catalysts, reaction conditions were $320 \leq T \leq 450°$ C., p=1 bar, and $H_2/N_2$=3. The ranges of $E_a$ for some of the catalysts listed have different Ru loadings. The addition of Ba reduces $E_a$ from 103 kJ mol$^{-1}$ for Ru/YSZ to 46.2 kJ mol$^{-1}$ for Ba—Ru/YSZ, a value that is among the lowest reported to date and manifested in the good performance observed at low temperature.

CONCLUSIONS

This disclosure adds to the long running history of ammonia-synthesis catalysts in terms of both practical advances and improved fundamental understanding. Experimentally, yttria-stabilized zirconia (YSZ) is shown to be a highly active support for Ru nanocrystals and the reaction is greatly accelerated by promoters. Cesium was the most effective promoter, but it was unstable, while the Ba—Ru/YSZ catalysts achieved the highest specific rates reported to date (approximately 1410 mmol $g_{Ru}^{-1}h^{-1}$ at T=400° C., p=1 MPa). It is notable that both of these findings were revealed only when operating at space velocities much greater than values conventionally employed for catalyst investigations (e.g., 10000 h$^{-1}$), and it is suggested that SV is as important as other parameters (temperature, pressure, $H_2/N_2$ ratio) when comparing catalysts or considering reactor designs. The low activation energy of Ba—Ru/YSZ enables significant rates to be maintained as low as T=300° C. when coupled with appropriate stoichiometry control.

A microkinetic reaction mechanism was developed that captured the observed behavior with high fidelity over a broad range of temperatures ($300 \leq T \leq 450°$ C.), inlet compositions ($0.1 \leq H_2/N_2 \leq 3.0$), and pressures ($0 \leq p \leq 10$ bar gauge).

The mechanism of reaction pathways is expanded upon in two ways. The first is to quantify parameters that represent the Ba—Ru/YSZ catalyst. The second, and most important, was to introduce coverage-dependent activation energies that can accommodate the effects of hydrogen and nitrogen catalyst poisoning. This enabled, for instance, the accurate prediction of optimal $H_2/N_2$ ratios as functions of temperature. The reaction mechanism in the present disclosure is accurate over large temperature ranges, which is a significant advance over mechanisms that were tailored to high- and low-temperature regimes. Thus, the validated, predictive reaction mechanism can play a valuable role in assisting the design and implementation of practical reactor technology. Although the present disclosure focuses on the Ba—Ru/YSZ catalyst, the framework developed to account for Ru-support interactions and coverage-dependent rate behavior is expected to have broad applicability for Ru-based ammonia-synthesis catalysts.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims. Additional information about the present disclosure can be found in Appendix A, which is incorporated by reference in its entirety.

What is claimed is:

1. A catalyst for synthesizing ammonia, the catalyst comprising:
    at least one of a transition metal and a transition metal oxide comprising ruthenium (Ru) supported by yttria-stabilized zirconia (YSZ), wherein the transition metal is promoted by at least one of an alkali metal and an alkaline-earth metal including barium (Ba), and wherein the Ru-supported and Ba-promoted YSZ has an activation energy $E_a$ of no more than about 46.2 kJ/mol for synthesis temperatures ranging between 300 degrees Celsius (° C.) and 450° C.

2. The catalyst of claim 1, wherein the YSZ includes yttrium (Y) and zirconium dioxide ($ZrO_2$), wherein the $ZrO_2$ is modified by Ba and potassium (K), and wherein the Ru is supported on the Ba-modified and K-modified $ZrO_2$.

3. The catalyst of claim 2, wherein the Ru is alloyed with the Y of the YSZ.

4. The catalyst of claim 1, wherein the YSZ is a porous YSZ tube, and wherein the porous YSZ tube comprises an outside diameter of 1 centimeter (cm) and a wall thickness of 0.134 cm.

5. The catalyst of claim 4, wherein the porous YSZ tube comprises 4% yttrium oxide ($Y_2O_3$) and 96% zirconium dioxide ($ZrO_2$).

6. The catalyst of claim 4, wherein a Brunauer, Emmett and Teller (BET) surface area of the YSZ is 2.24 square meters per gram ($m^2g^{-1}$).

7. A method of making a catalyst for synthesizing ammonia, comprising:
    providing a support comprising a porous tube yttria-stabilized zirconia (YSZ);
    loading at least one of a transition metal and a transition metal oxide comprising ruthenium (Ru) onto the support using wet impregnation; and
    loading at least one of an alkali metal and an alkaline-earth metal including Barium (Ba) as a promoter onto the support using wet impregnation, wherein the Ru-supported and Ba-promoted YSZ has an activation energy $E_a$ of no more than about 46.2 kJ/mol for synthesis temperatures ranging between 300 degrees Celsius (° C.) and 450° C.

8. The method of claim 7, wherein multiple promoters comprising the promoter are loaded individually onto the support.

9. The method of claim 7, wherein the Ru is loaded in a range of about $0.4 \leq$ weight percent $\leq 1.0$.

10. The method of claim 7, wherein the porous tube YSZ comprises about 4% yttrium oxide ($Y_2O_3$) and about 96% zirconium dioxide ($ZrO_2$).

11. The method of claim 7, wherein a Brunauer, Emmett and Teller (BET) surface area of the porous tube YSZ is about 2.24 square meters per gram ($m^2g^{-1}$).

12. A method of producing ammonia, comprising:
    providing a catalyst, comprising at least one of a transition metal and a transition metal oxide comprising ruthenium (Ru) supported by yttria-stabilized zirconia (YSZ), wherein the transition metal is promoted by at least one of an alkali metal and an alkaline-earth metal including Cesium (Cs), and wherein the Ru-supported and Cs-promoted YSZ has an activation energy $E_a$ of no more than about 65.0 kJ/mol for synthesis temperatures ranging between 300 degrees Celsius (° C.) and 450° C.; and
    providing nitrogen and hydrogen to the catalyst to produce the ammonia.

13. The catalyst of claim 1, wherein the YSZ includes yttrium oxide ($Y_2O_3$) and zirconium dioxide $ZrO_2$.

14. A catalyst for synthesizing ammonia, the catalyst comprising:
    at least one of a transition metal and a transition metal oxide comprising ruthenium (Ru) supported by yttria-stabilized zirconia (YSZ), wherein the transition metal is promoted by at least one of an alkali metal and an alkaline-earth metal including cesium (Cs), and wherein the Ru-supported and Cs-promoted YSZ has an activation energy $E_a$ of no more than about 65.0 kJ/mol for synthesis temperatures ranging between 300 degrees Celsius (° C.) and 450° C.

15. The catalyst of claim 14, wherein the YSZ includes yttrium (Y) and zirconium dioxide ($ZrO_2$), wherein the $ZrO_2$ is modified by Cs and potassium (K), and wherein the Ru is supported on the Cs-modified and K-modified $ZrO_2$.

16. The catalyst of claim 15, wherein the Ru is alloyed with the Y of the YSZ.

17. The catalyst of claim 14, wherein the YSZ is a porous YSZ tube, and wherein the porous YSZ tube comprises an outside diameter of 1 centimeter (cm) and a wall thickness of 0.134 cm.

18. The catalyst of claim 17, wherein the porous YSZ tube comprises 4% yttrium oxide ($Y_2O_3$) and 96% zirconium dioxide ($ZrO_2$).

19. The catalyst of claim 17, wherein a Brunauer, Emmett and Teller (BET) surface area of the YSZ is 2.24 square meters per gram ($m^2g^{-1}$).

\* \* \* \* \*